United States Patent
Shao et al.

(10) Patent No.: US 7,562,814 B1
(45) Date of Patent: Jul. 21, 2009

(54) SYSTEM AND METHOD FOR IDENTITY-BASED FRAUD DETECTION THROUGH GRAPH ANOMALY DETECTION

(75) Inventors: Xuhui Shao, San Diego, CA (US); Jianjun Xie, San Diego, CA (US); Tao Hong, San Diego, CA (US); Allen Jost, San Diego, CA (US)

(73) Assignee: ID Analytics, Inc., San Diego, CA (US)

( * ) Notice: Subject to any disclaimer, the term of this patent is extended or adjusted under 35 U.S.C. 154(b) by 384 days.

(21) Appl. No.: 11/026,556

(22) Filed: Dec. 30, 2004

(51) Int. Cl.
*G06K 5/00* (2006.01)

(52) U.S. Cl. .......................... 235/380; 235/375; 705/44

(58) Field of Classification Search ................. 235/380, 235/375, 379, 382.5, 487; 705/44, 39, 38, 705/42, 75, 1

See application file for complete search history.

(56) References Cited

U.S. PATENT DOCUMENTS

| | | | |
|---|---|---|---|
| 5,361,201 A | | 11/1994 | Jost et al. |
| 5,745,654 A | | 4/1998 | Titan |
| 5,794,178 A | | 8/1998 | Caid et al. |
| 5,819,226 A | * | 10/1998 | Gopinathan et al. ........... 705/44 |
| 6,038,555 A | | 3/2000 | Field et al. |
| 6,094,643 A | * | 7/2000 | Anderson et al. ............ 705/44 |
| 6,095,413 A | * | 8/2000 | Tetro et al. .................. 235/380 |
| 6,173,275 B1 | | 1/2001 | Caid et al. |
| 6,226,408 B1 | | 5/2001 | Sirosh |
| 6,330,546 B1 | | 12/2001 | Gopinathan et al. |
| 6,366,897 B1 | | 4/2002 | Means et al. |
| 6,430,539 B1 | | 8/2002 | Lazarus et al. |
| 6,513,018 B1 | | 1/2003 | Culhane |
| 6,597,775 B2 | | 7/2003 | Lawyer et al. |
| 6,974,079 B1 | | 12/2005 | Strothmann et al. |
| 6,993,514 B2 | | 1/2006 | Majoor |
| 7,234,156 B2 | | 6/2007 | French et al. |
| 2001/0001148 A1 | | 5/2001 | Martin et al. |
| 2001/0001877 A1 | * | 5/2001 | French et al. ................ 713/182 |
| 2001/0011245 A1 | | 8/2001 | Duhon |
| 2001/0047326 A1 | | 11/2001 | Broadbent et al. |
| 2002/0029154 A1 | | 3/2002 | Majoor |
| 2002/0083008 A1 | | 6/2002 | Smith et al. |
| 2002/0099649 A1 | * | 7/2002 | Lee et al. ...................... 705/38 |
| 2002/0155830 A1 | | 10/2002 | Iyer |
| 2002/0161609 A1 | | 10/2002 | Zizzamia et al. |

(Continued)

OTHER PUBLICATIONS

"Falcon™ ID, Your weapon in the fight against identity fraud", product literature from www.fairisaac.com, Sep. 2004.

(Continued)

*Primary Examiner*—Edwyn Labaze
(74) *Attorney, Agent, or Firm*—Paul, Hastings, Janofsky & Walker LLP

(57) ABSTRACT

A method for identifying a fraudulent account application includes receiving a new account application comprising a plurality of identity-related fields and linking the identity-related fields associated with the new account application with identity-related fields associated with a plurality of historical account applications. The links form a graphical pattern on which statistical analysis can be performed to determine the likelihood that the new account application is fraudulent. The statistical analysis can comprise comparing the graphical pattern to a known, or normal graphical pattern in order to detect differences, or anomalies occurring in the graphical pattern associated with the new account application.

39 Claims, 9 Drawing Sheets

U.S. PATENT DOCUMENTS

| | | | |
|---|---|---|---|
| 2003/0018558 A1 | 1/2003 | Heffner et al. | |
| 2003/0041047 A1 | 2/2003 | Chang et al. | |
| 2003/0208684 A1* | 11/2003 | Camacho et al. | 713/186 |
| 2004/0090439 A1 | 5/2004 | Dillner | |
| 2004/0093261 A1 | 5/2004 | Jain et al. | |
| 2004/0111359 A1 | 6/2004 | Hudock | |
| 2004/0153663 A1* | 8/2004 | Clark et al. | 713/200 |
| 2005/0021476 A1 | 1/2005 | Candella et al. | |
| 2005/0108063 A1 | 5/2005 | Madill, Jr. et al. | |
| 2005/0144143 A1 | 6/2005 | Freiberg | |
| 2006/0101508 A1* | 5/2006 | Taylor | 726/7 |
| 2006/0149674 A1* | 7/2006 | Cook et al. | 705/44 |
| 2006/0202012 A1* | 9/2006 | Grano et al. | 235/379 |
| 2006/0271457 A1* | 11/2006 | Romain et al. | 705/35 |
| 2007/0090181 A1* | 4/2007 | Varadarajan et al. | 235/380 |
| 2007/0129999 A1* | 6/2007 | Zhou et al. | 705/14 |

OTHER PUBLICATIONS

Non-final Office Action from U.S. Appl. No. 11/149,516 dated Aug. 6, 2007.
Final Office Action from U.S. Appl. No. 11/149,516 dated Jan. 23, 2008.
Non-final Office Action from U.S. Appl. No. 11/026,552 dated Jun. 26, 2007.
Final Office Action from U.S. Appl. No. 11/026,552 dated Dec. 31, 2007.
Non-final Office Action from U.S. Appl. No. 11/027,692 dated Jul. 17, 2007.
Final Office Action from U.S. Appl. No. 11/027,692 dated Dec. 12, 2007.
Non-final Office Action from U.S. Appl. No. 11/026,566 Jun. 28, 2007.
Non-final Office Action from U.S. Appl. No. 11/026,566 dated Jan. 25, 2008.
Office Action from U.S. Appl. No. 11/149,516 dated Aug. 1, 2008.
Non-final Office Action from U.S. Appl. No. 11/026,552 dated Jun. 2, 2008.
Final Office Action from U.S. Appl. No. 11/027,692 dated Jun. 10, 2008.
Non-final Office Action from U.S. Appl. No. 11/248,567 dated Jun. 6, 2008.
Final Office Action from U.S. Appl. No. 11/027,692 dated Oct. 15, 2008.
Non-final Office Action from U.S. Appl. No. 11/248,567 dated Nov. 19, 2008.

* cited by examiner

SYSTEM AND METHOD FOR IDENTITY-BASED FRAUD DETECTION THROUGH GRAPH ANOMALY DETECTION

RELATED APPLICATION INFORMATION

This application claims priority as a Continuation-In-Part application under 35 U.S.C. §120 to U.S. patent application Ser. No. 10/841,946, entitled "System and Method for Identity-Based Fraud Detection", filed May 7, 2004, which in turn claims priority under 35 U.S.C. §119(e) to U.S. provisional application Ser. No. 60/469,865, entitled "System And Method For Identity-Based Fraud Detection", filed May 12, 2003, both of which are hereby incorporated by reference in the entirety as if set forth in full herein.

BACKGROUND

1. Field of the Inventions

The present invention relates to systems and methods for detecting and preventing the fraudulent acquisition and use of consumer accounts.

2. Background Information

Identity theft is currently one of the fastest-growing financial crimes worldwide. Reports indicate that up to 750,000 identities were stolen in the U.S. during 2001, which corresponds to up to 30 million stolen credit card, checking, telecommunications and other accounts. During this same year the direct losses accruing to credit and service grantors as a consequence of accounts created by means of identity theft has been estimated at over $3 billion in financial services and $35 billion across other vertical markets. Account "takeover", in which control of an account relationship is established through identity theft, is similarly on the rise.

Identity theft may be perpetuated in a variety of ways, but has recently been facilitated by the increasing prevalence of Internet-based transactions. Issuer's credit and debit card accounts, and associated identification information, are compromised daily on the Internet and that information is exchanged in public "chat rooms" for use by fraudsters. In particular, this identification and account information is accessible by fraudsters who scan the Internet for legitimate web sites employing sub-standard security measures. Once such sites are identified by fraudsters, they may be continually exploited through capture of all of the sensitive card and consumer identity information provided by consumers.

A number of commercial entities are involved in the business of attempting to limit credit card and other types of fraud related to identity theft. In general, the methods employed by these entities operate to expose potentially fraudulent transactions by determining that they are not in accord with established usage patterns of a particular card or account. Such usage patterns may be functions of, for example, geographic location, vendor, type of merchandise or service, and frequency of use. Use of these methods typically results in notification of a merchant or issuer only when there is a deviation from an established or predictable usage pattern.

Various proposed techniques to address fraud rely upon improved identification of known fraudulent names, fraudulent addresses, fraudulent phone numbers, fraudulent social security numbers, and other fraudulent personal information. These techniques are predicated upon the fact that a substantial percentage of number of fraud cases are perpetrated by repeat offenders or organized groups which utilize the same set of fraudulent personal information. In one such technique personal data known to be fraudulent is pooled in a central database. Applications for purchasing cards or other consumer accounts are then sent to the fraud database for inspection. The information on the application is then compared with the fraudulent information content within the database. If a match is identified, the merchant is alerted that an attempted fraud may be occurring. Unfortunately, these types of "matching" systems may exhibit a proclivity of generating "false positives" and inappropriately warning merchants of potential fraudulent acts. This is because while certain information within an application submitted by a merchant may match information within the database known to have been fraudulently used, an alert is generally sent to the merchant even if other portions of the merchant application are not identified as corresponding to such fraudulent information. That is, the reliability of the match is typically not determined, nor is an indication of such reliability provided to the merchant. Unfortunately, the likelihood of generating a false positive match and sending a corresponding alert to the applicable merchant indication is increased in the absence of such reliability information.

SUMMARY OF THE INVENTION

A fraud detection system is configured to detect fraudulent account applications by establishing a graphical representation of the information contained in the account application via links to historical account application records. The graph is then statistically analyzed to determine if it exhibits anomalies relative to what is considered a normal graph that indicate a likelihood of fraud.

In one aspect, historical information is used to define what a normal graph should look like.

In another aspect, case studies and/or off-line statistical analysis is used to develop a statistical model of a normal graph once it is identified.

In still another embodiment, rules based on domain knowledge are used to evaluate the graph against the statistical model to determine if an anomaly is present and to weight the degree of the anomaly for fraud detection.

These and other features, aspects, and embodiments of the invention are described below in the section entitled "Detailed Description."

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

1. System Overview

Figure 1:
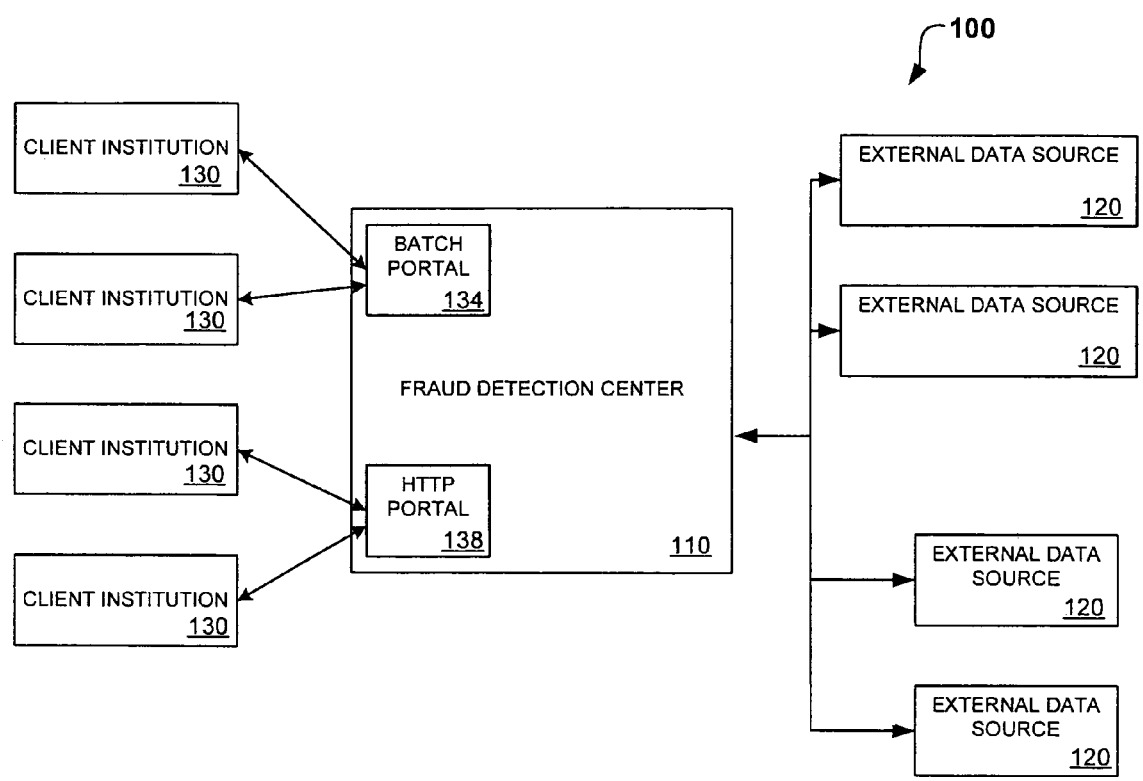
FIG. 1 depicts a fraud detection system which includes a fraud detection center configured to implement identity-based fraud detection in accordance with the present invention.

The present invention is directed to a system and method for determining a likelihood of identity-related fraud associated with various types of activities and transactions (e.g., applying for credit). In an exemplary embodiment of the invention fraud detection is effected using a set of techniques based upon Graph Theoretic Anomaly Detection (GTAD), which provides a general methodology for building inferential models using large-scale graph-structured data. Use of this approach enables suspicion of fraud or lack thereof to be propagated through a graphical network of related identity records in a computationally-feasible manner, thereby providing a basis for subsequent fraud detection analysis. In accordance with one exemplary embodiment of the invention, anomaly detection techniques are used in identifying features of the graphical network potentially useful in evaluating the probability that a given identity record is fraudulent. These techniques have proven to be efficient and effective even though the number of possible useful features of a given graphical network will generally be immense, and even though it will typically be infeasible to explicitly construct a set of mathematical structures describing such graphical network.

The inventive system is disposed to operate upon an incoming stream of input identity records, each of which contains one or more identity-related fields. In response to each input identity record, the inventive system generates a return identity record containing a numerical "fraud score" indicative of the likelihood that the input identity record is fraudulent together with a set of "reason codes" related to the score. Specifically, the reason codes comprise discrete indicators of the factors likely contributing to the fraud score, and may be used to guide a fraud investigator in determining whether an identity record is actually fraudulent.

Each input identity record is generally created on the basis of some action taken by an individual consumer other than initiation of a monetary transaction. For example, input identity records may comprise credit applications, existing account status (e.g., account holder identity information), account status changes, or account payment records. Typical account status changes may include, for example, changes in identity elements such as address or phone number. Account status changes may also result from modification of the limits of existing credit lines, authorization of new users in connection with existing credit accounts, and issuance of additional physical credit cards. Common to each input identity record are one or more identity-related fields such as name, address, social security number, home and work phones, IP address, email address, originating telephone number.

As is described in further detail below, the incoming stream of input identity records is first processed by a sequence of filters configured to examine the content of various fields of each input identity record in order to determine various characteristics of the identity record (e.g., whether the given phone and social security numbers are valid, and whether the given phone number is for a mobile phone). These characteristics of the input identity record may be determined without reference to any historical identity record data, and result in generation of a set of "nodal features" characterizing the input identity record. Subsequent to the computation of these nodal features, all historical identity records that are linked to the current identity record by a common identity-related parameter (e.g., a shared name or address) are retrieved from a database of historical identity records. Various statistical summaries, or "network-based features", of the resultant graphical network of related identity records are then computed. Once sets of nodal and network features have been determined, combinations of these features termed "meta-features" may also be computed. Finally, some or all of the nodal features, network-based features and meta-features associated with the input identity record may be utilized in generating the fraud score and reason codes for the identity record.

Turning now to FIG. 1, a fraud detection system 100 includes a fraud detection center 110 configured to implement identity-based fraud detection in accordance with the present invention. The fraud detection center 110 may utilize information provided by various external data sources 120 of the type described below in connection with validating or otherwise processing input identity records received from various client institutions 130. As mentioned above, a fraud score and associated reason codes are provided to the applicable client institution 130 in response to each such input identity record. In exemplary embodiments the fraud detection center 110 is capable of responding to input identity records in substantially real-time through either a batch portal 134 or an online HTTP-based portal 138.

The external data sources 120 may be operated by, for example, credit/debit card issuers, credit bureaus, the U.S. Postal Service, the Social Security Administration, the Department of Motor Vehicles, and telecommunications carriers. The type of identity-based data obtained from the sources 120 may include, for example, name, address, social security number, home and work phone numbers, and email address. Potential client institutions 130 may include, for example, credit-granting entities such as bank and non-bank card issuers of purchasing cards, merchants, utility companies and telecommunications carriers.

Figure 2:
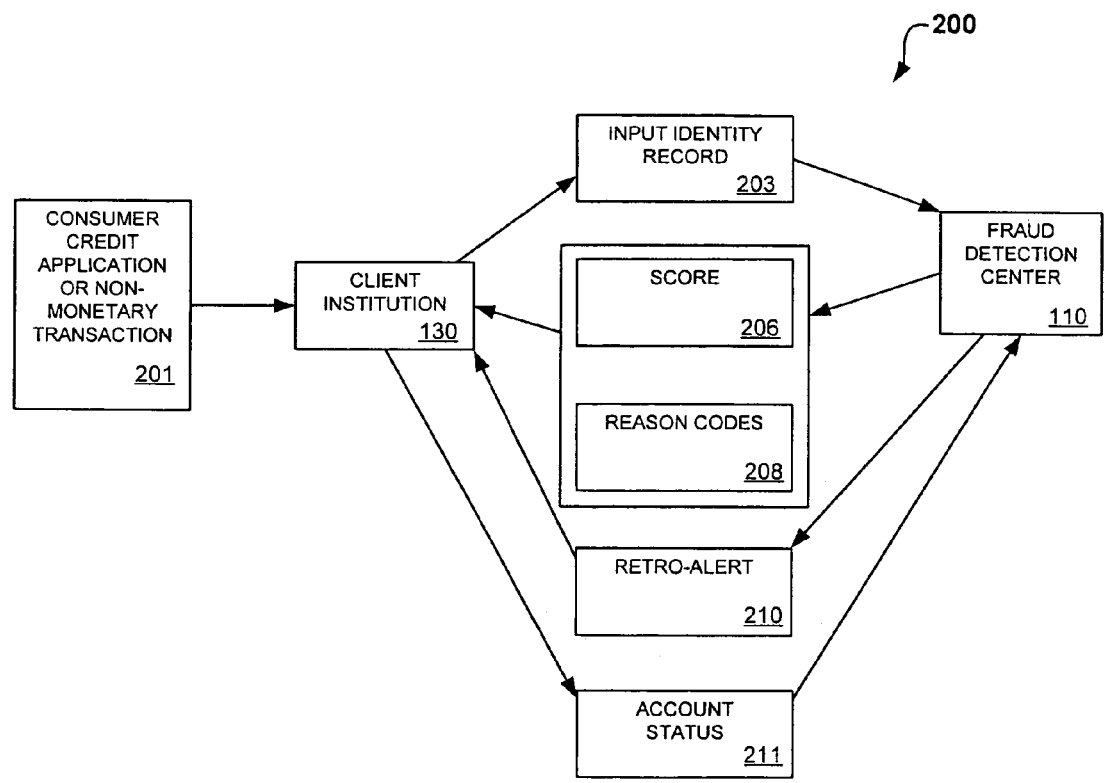
FIG. 2 shows a process flow diagram representative of the manner in which input identity records are processed by the fraud detection center of FIG. 1 in accordance with the invention.

Referring to FIG. 2, there is shown a process flow diagram 200 representative of the manner in which input identity records are processed by the fraud detection center 110 in accordance with the invention. As noted above, each input identity record is generally created on the basis of some action taken by an individual consumer other than initiation of a monetary transaction (e.g., completion of a consumer credit application), although the teachings of the present invention are equally applicable to detecting fraudulent monetary-based transactions. Common to each input identity record are one or more identity-related fields such as name, address, social security number, home and work phones, IP address, email address, and originating telephone number. As is discussed below, the sophisticated capability of the present invention to detect identity-related fraud even at the application stage of the account creation process is believed to represent a significant advance over existing fraud detection schemes, and is expected to substantially reduce fraud-related losses when implemented.

The completed credit application or other non-monetary identity record 201 is received from the consumer by the applicable client institution 130. In general, each input identity record 203 provided to the fraud detection center 110 is comprised of only an extract of the information contained within each identity record. As is discussed below, the fraud detection center 110 then evaluates each received input identity record 203 and computes an associated statistically-based probability of fraud. This probability is represented by a fraud score 206. In the exemplary embodiment this fraud score 206, and reason codes 208 describing an underlying rationale for the score 206, are returned to the client institution 130 so that additional identity information can be sought from the consumer initiating the request 201.

As is discussed below, the fraud detection center 110 may utilize information from other credit applications and other identity records sharing common identity-related information with the input identity record 203 currently under evaluation. Moreover, additional credit applications and other identity records linked to a given input identity record 203 on the basis of common identity-related information may be received (typically via a number of different channels) by the fraud detection center 110 even after a corresponding score 206 has been provided to the requesting client institution 130. In certain cases consideration of this additional information may appreciably increase the level of fraud-related suspicion attaching to the previously processed identity record 203. In such event, an additional return value 210 or "retro-alert" may be communicated to the requesting client institution 130. Such a retro-alert 210 may be issued one or more days following generation of the original score 206 and would include an explanation as to the manner in which the circumstances surrounding the original input identity record 203 have changed. This may be helpful in situations where the initial decision as to the original score 206 was required to be made substantially instantaneously, but in which there also exists a delay between consummation of the requested identity record 201 with the consumer (e.g., establishment of a credit card account in response to submission of a credit card application, shipment of goods in response to a purchase order, or provision of requested services). In such case the issuance of a retro-alert 210 may reduce or eliminate fraud-related losses to the extent received prior to the completion of performance in response to the requested identity record 201.

The client institution 130 may be configured to periodically send updates concerning the status 211 of all its accounts to the fraud detection center 110 in order to enable the evolution of such accounts to be tracked over time. This facilitates the subsequent detection of other fraudulent identity records related by the similar use of one or more identity-related elements (e.g., name, telephone number or address).

Figure 3:
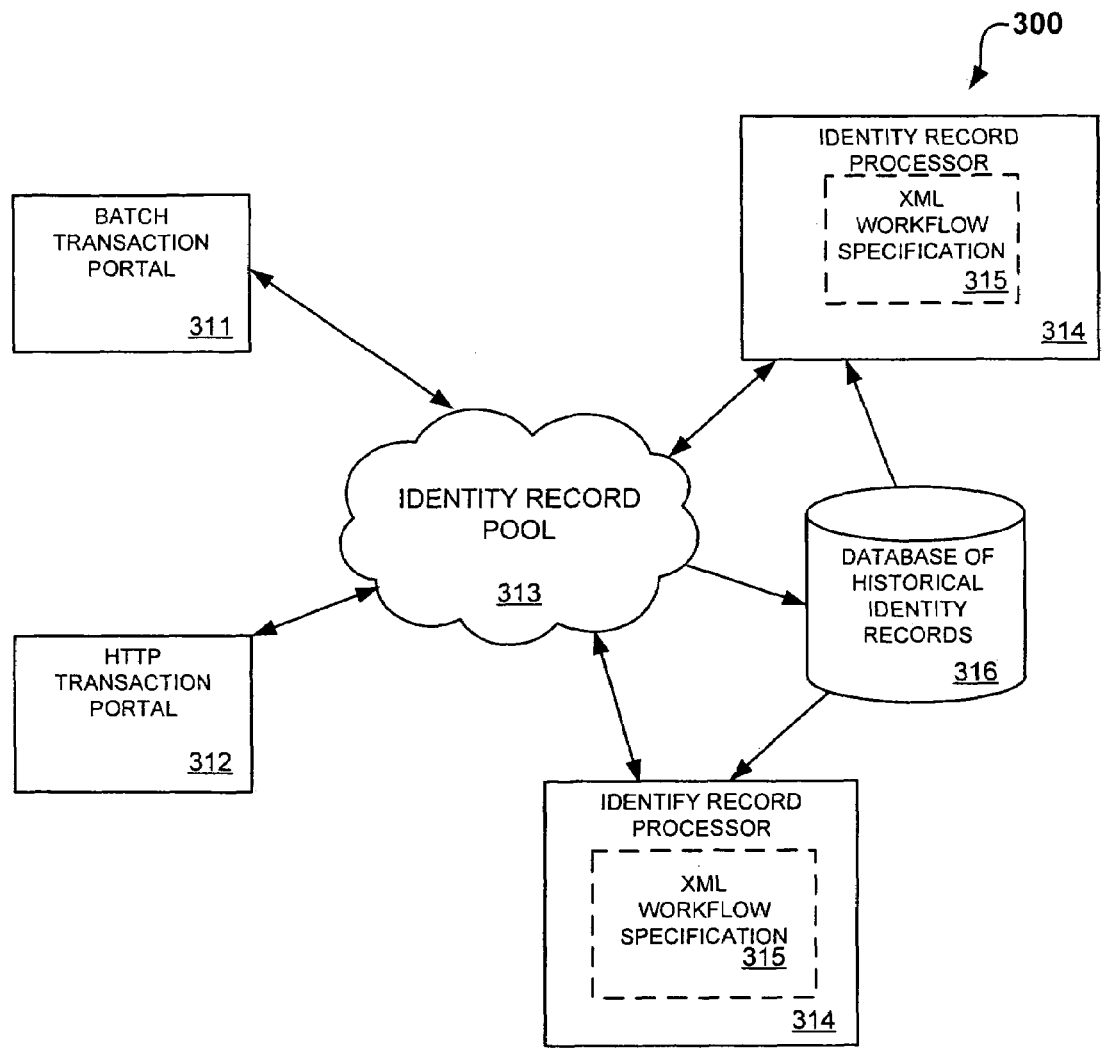
FIG. 3 provides a high-level representation of the fraud detection center of FIG. 1.

Turning now to FIG. 3, a high-level representation is provided of the fraud detection center 110. As shown, the fraud detection center 110 includes a batch transaction portal 311 and an HTTP transaction portal 312. The batch transaction portal 311 accepts input identity records via batch files from the client institutions 130, while the HTTP transaction portal 312 receives input identity records from the client institutions 130 via a Web connection. Each transaction portal 311, 312 reformats received input identity records into a predefined internal format and rejects malformed input identity records. After being placed in the appropriate internal format, each input identity record is accorded a sequence number used for tracking purposes and is passed to an identity record pool 313.

Once an identity record has been placed within the identity record pool 313, it is retrieved from the pool 313 by one of a plurality of identity record processors 314 on the basis of one or more of its characteristics (e.g., client ID, requested action, record priority and so on). The identity record processor 314 which removes a given identity record from the identity record pool 313 is configured to compute, in the manner described herein, statistical estimates of the probability of fraud associated with the identity record. In addition, as a result of this computation the identity record processor 314 also generates a summary of actions likely to be useful in verifying whether the identity record is, indeed, fraudulent.

The computation effected by each identity record processor 314 with respect to a given input identity record is carried out in accordance with an associated XML-based workflow specification 315, which contains a description of all of the steps necessary to perform the computation. During this computation, reference may be made to a database of historical identity records 316 in order to determine whether any previously processed identity records have similar characteristics as the current identity record. Such similarity between characteristics (e.g., identity-related characteristics such as name or telephone number) of the current identity record and various previous identity records establishes links to such previous identity records. Consistent with the invention, these links form a portion of a large network or graph that is used to evaluate the likelihood of the current identity record being fraudulent.

Upon completion of the computation performed in response to an input identity record, the identity record processor 314 generates a corresponding return identity record and delivers it to the identity record pool 313. The return identity record is then communicated, via the same transaction portal 311, 312 through which the corresponding input identity record was received, to the client institution 130 from which such input identity record was received. Again, each return identity record includes a fraud score indicative of the likelihood that the input identity record is fraudulent together with a set of reason codes related to the score. After the results are returned, an off-line process (not shown) collects all identity records processed through the identity record pool 313 and updates the historical identity record database 316. This off-line process is typically performed after enough identity records have been processed to make the amortized cost of merging the new identity records into the historical database 316 sufficiently small. Since rebuilding the historical identity record database 316 may generally be done relatively quickly (i.e., within a few hours), in the exemplary embodiment this merger process typically occurs every few days.

2. Modeling Infrastructure

As is described in further detail below, the identity record processors 314 operate upon an abstract data type referred to hereinafter as a record. In particular, each identity record within the identity record pool 313 is associated with a record having multiple fields, each of which is identified by name. In the exemplary embodiment each field contains a Java object utilized in computing the fraud score 206 ultimately associated with each input identity record. As the computation of the score 206 progresses, new fields are defined in order to contain the results of computations applied to previously-existing fields or the results of queries to the historical identity record database 316. In this way each record provides a basis for computing a statistically-based prediction of the probability of fraud associated with a given input identity record.

a. Abstract Record Datatype

The abstract record datatype provides a framework around which all modeling or "fraud prediction" computations are structured. Multiple implementations of the abstract record are available, but all provide the ability to define, access and modify fields in the record by name. Records are relatively lightweight data structures and can thus be created and destroyed without substantial performance penalty. Generally, the values of the fields within the records are strings or floating point numbers, but in a few well defined situations such as link analysis, fields contain values that are themselves container types such as a java.util.List of records. Where possible, type specific accessors are used. These accessors provide data conversions where appropriate.

Records containing only primitive types such as strings or numbers can be read from databases or files using a number of formats. Subsets of the fields in a record can be written to databases or files using the same format conversions.

b. Dataflow Architecture & Computation

As mentioned above, each record contain fields capable of storing intermediate values used by the applicable identity record processor 314 in computing the score 206 and reason codes 208 associated with a respective input identity record. Each step of the computation is implemented by a Java class that operates on certain named fields and produces one or more other field values. The general convention for structuring a computation step is described by the Java interface com.ida.dataAccess.Filter. In general, such a filter is responsible for accepting records from its input, transforming each of them as necessary, and providing the transformed values on request. The input of each such filter comprises either a sequence of records corresponding to an input stream of raw identity records, or the sequence of records output by the filter implementing the previous computational step.

Multiple implementations of this dataflow architecture are possible and each different implementation will result in different control flow properties or other characteristics. For example, the data flow specified by the applicable XML workflow specification 315 may define the connection of Java objects that pass the progressively-elaborated record data structures described above using direct method invocation or via an interpreter. Since the processing of the record data structure corresponding to one input identity record cannot in principle affect the processing associated with another identity record, this same data flow could be implemented using multiple threads for higher performance on multi-processor hardware.

Each XML workflow specification 315 uses XML in specifying all options for the filters of a given dataflow as well as the sequence in which such filters are implemented. The use of XML permits dataflows of substantially different complexities to be specified in a similar fashion. The level of complexity of the specification 315 may be quite low if only a few instance variables require initialization, but may be quite complex if an elaborate specification must be parsed and a complex data structure created.

In general, each XML workflow specification 315 defines two types of dataflow. A first type of dataflow specifies the origins of input identity records and the ultimate destination of such identity records, while a second type of dataflow lacks this origin and destination information. This first type of dataflow is useful when processing a large batch of file-based identity records, such as in connection with the evaluation of fraud prediction models using test files containing previously-defined identity records. The second type of data flow is utilized in situations where the input and output are implicit. For example, in embodiments of the invention suitable for commercial implementation, the identity record processors 314 are charged with removing identity records from the identity record pool 313 and returning these identity records to the pool 313. In this case, the dataflow necessarily has little or no knowledge of how identity records are to be removed from or returned to the pool 313. Another example of such a "headless" dataflow is in the thread filter which invokes multiple threads to perform a number of computational steps on records in parallel.

The following example is a dataflow that illustrates how multiple files may be read using a business specific data input class clients. SuperBankDataReader, sampled by the sampler class and then averaged by the Averager class before the output is produced by the CSVWriter class.

```
<dataflow>
  <reader class="com.ida.clients.SuperEankDataReader">
    <fileset> Super??.dat </fileSet>
    <file> ExtraDataFile.dat </file>
  </reader>
  <filter class="Sampler" rate="10/1000"/>
  <filter class="Averager"/>
  <writer class="CSVRecordWriter"
    delimiters=',' file="fooble.esv"/>
</dataflow>
``` c. Task Workflow

The workflow architecture implemented by each identity record processors 314 supports the coordination of multiple tasks. Specifically, certain individual tasks are not initiated until one or more related predecessor tasks have been completed, and record data structures may be passed from one task to another. Currently-defined tasks include a shell scripting language similar to Java that is known as "bean shell" (see, e.g., http://www.beanshell.org/ for information concerning the underlying interpreter). The currently defined tasks further include self-contained dataflows which specify their own identity record sources and sinks, as well as a identity record processor operative to connect a dataflow to an identity record pool in manner described with reference to the identity record processor 314 of FIG. 3. The workflows implemented by each identity record processor 314 provide the mechanism by which fraud detection model evaluation (as described by a dataflow) is connected with the applicable identity record pool.

Generally, workflows are used to sequence initialization tasks that involve reading of large tables of weights or connecting to databases (e.g., the historical identity record database 316 and external data sources 120) so that these tasks conclude before actual identity record processing begins. During model training or evaluation (i.e., actual computation of a fraud probability), the final task in the workflow is a "dataflow" task that contains a dataflow with a specified identity record source and sink. In practical server implementations, the final step in the workflow is a "processor" task that contains a headless dataflow. The processor task invokes a number of worker threads that retrieve identity records from the identity record pool, processing them using the specified dataflow and returning the results to the identity record pool.

The following example illustrates the manner in which a workflow may be specified. In this case the jobs "foo" and "foo2" are prerequisites to the job "fob". These prerequisite jobs will be run either in parallel or in sequence according to the unspecified implementation of the workflow engine. Upon completion of the job foo, the job fob will be started and will be provided with the output from job foo. The details of each job are of no interest to the workflow system, only the sequencing of the operation of the jobs and the coordination of their input and output data structures.

```
<workflow>
<job name="foo">
    <produces> z </produces>
    <dataflow
    . . .
    </dataflow/>
</job>
<job name="foo2">
    <dataflow>
    . . .
    </dataflow/>
</job>
<job name="fob">
    <produces> model </produces>
    <dependsOn> foo.z </dependsOn>
    <dependsOn> foo2 </dependsOn>
    <dataflow>
      . . .
    </dataflow/>
</job>
</workflow>
```

3. Identity Record Processing Data Flow

Figure 4:
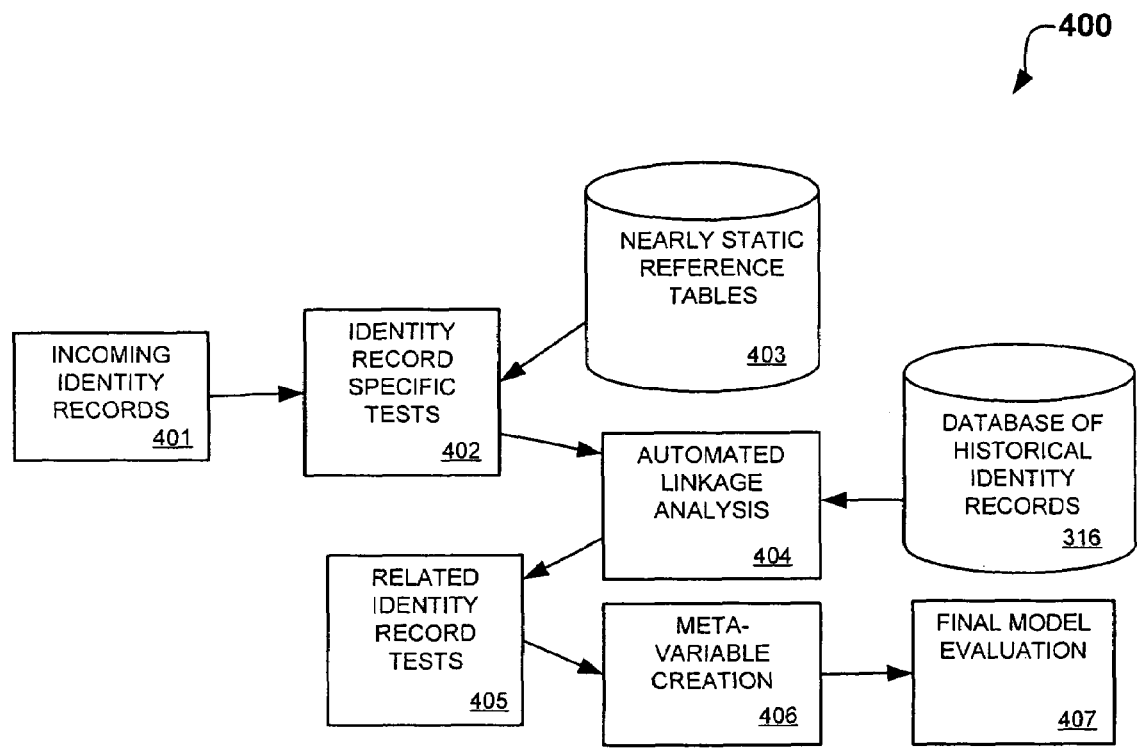
FIG. 4 illustratively represents a model data flow representative of the processing of input identity records within an identity record processor incorporated within the fraud detection center of FIG. 1.

FIG. 4 illustratively represents a model data flow 400 representative of the processing of input identity records within one of the identity record processors 314 pursuant to the applicable XML-based workflow specification 315. In the exemplary embodiment the model data flow of FIG. 4 may be implemented using the dataflow and record data structures described above. As shown, a stream of incoming identity records 401 is first processed by a sequence of filters operative to examine each input identity record for the presence of various characteristics potentially predictive of the likelihood of fraud (step 402). For example, the filters may determine whether various identity-related parameters (e.g., social security number, address and telephone number) included within the input identity record are valid. The filters may also identify the type of real estate (e.g., commercial establishment, apartment dwelling or single family residence) corresponding to any address information within the input identity record, and determine whether any telephone numbers within the input identity record are for wireless phones. As a result of the processing effected by the filters, a set of characteristics of the input identity record are produced. These characteristics or "nodal features" may be determined using various tables and databases 403 and without reference to any historical identity record data.

Subsequent to computation of the nodal features of a current input identity record, all prior identity records recorded within the historical identity record database 316 that related to the current input identity record by way of a shared identifying characteristic (e.g., name, address, social security number, telephone number or the like) are retrieved from the historical identity record database 316 (step 404). In the case of identity records potentially linked by non-numerical identity information (e.g., name or address), all identity records containing approximately matched non-numerical identity information are retrieved from the database 316. In certain embodiments pragmatism may dictate that the size of the retrieval be limited to on the order of a thousand related identity records. This limit will generally be set sufficiently large to ensure that characteristics or values derived from a random subset of the complete set of linked identity records will be approximately the same as corresponding characteristics or values derived from such complete set. In embodiments in which each input identity record is represented as a record (described below), the set of linked identity records are stored within the record being processed such that one field is devoted to each kind of linkage.

Various statistical summaries of the linked identity records retrieved from the historical identity record database 316 may then be computed (step 405). These statistical summaries, or "network-based features", may range in complexity from raw counts to graphical representations of metrics based upon previously-computed intermediate values stored within the database 316. These statistical summaries may be computed in a variety of ways, such as directly in Java or through a headless dataflow of the type described below.

It is noted that the network-based features characterizing a given input identity record will not necessarily exclusively depend upon the set of related identity records retrieved from the historical database 316 in the manner described above. This is because the features examined in these related identity records may themselves comprise network-based features, which creates the possibility of potentially unbounded regress; that is, it is conceivable that a given network based feature could potentially be a function of all directly or indirectly linked nodes. Details relating to computation of such nested or recursive network functions are provided below. The only practical constraint on this function is that the intermediate values on the related identity records must be stored in a finite and relatively small amount of space. There is a theoretical constraint in that the linkages established within the historical identity record database 316, combined with the order in which the intermediate values stored by the records for related identity records are computed, enforce the limit that the historical identity record database 316 forms a directed acyclic graph. This is generally acceptable as the directed acyclic nature of this graph simply reflects normal physical causality.

Once all nodal and network features have been computed, combinations of these features (hereinafter "meta-features") may then be computed (step 406). A primary purpose for meta features is to introduce non-linearity into otherwise linear decision models. Another purpose is to make certain features more accessible to certain modeling techniques such as the expansion of a categorical feature into multiple binary features. Finally, all available features can be combined into an output score and reason codes (step 407). A variety of machine learning technologies may be used to effect this final computation including, for example, artificial neural networks or decision trees.

One advantageous feature of the fraud detection modeling process of the invention is that statistically-based fraud probability computations (i.e., model evaluation) proceed without creating a profile. This is in contrast to the approach taken in conventional transaction-based fraud systems, or matching to a known identity as is done in credit scoring systems. Profiles and identity matching are ineffective against identity theft precisely because they depend on characteristics that identity thieves purposely obfuscate. Profile-based techniques depend on accurate identification of the incoming request with an existing profile and are ineffective when either identification fails or when no existing profile has sufficient depth. Identity matching is performed in credit scoring systems because identity thieves have access to the identifying information of victims and thus can successfully masquerade as the victim.

The process of evaluation described above will generally be effected both during real time operation of a completed fraud detection model, as well as during model development. One advantage of the inventive fraud detection architecture and implementation described herein is that very high throughput is possible during model development. This enables testing of a much larger set of potential features for relevance to a given fraud detection problem. Testing a larger variety of potential features permits model developers to gain a better intuitive understanding of the problem and broadens the scope of the search for appropriate inputs. This advantageously leads to substantially improved fraud detection performance.

4. Nodal Variables a. Verification Features

A number of verification features may be derived directly from the input identity record data received at the fraud detection center 110. For instance, home or office address information may be examined in order to determine whether the address in question corresponds to a valid address, an apartment, a post office box, a mail drop facility, a correctional facility, or a campground. Likewise, telephone numbers may be examined in order to determine whether they address a mobile phone, land line or pager. Social security numbers may also be checked to see whether they are valid, as well as when and where they were issued.

b. Time-Based Variables

Time-based variable such, as time-based nodal features, are useful in characterizing the age of an associated identity record. Such a characterization permits a time-based function to be applied to the identity record during the fraud detection process. Specifically, the effect of a known fraud may be decreased over time by computing a meta-variable comprised of a combination of a fraud indicator (described below) characterizing the fraud and a monotonically decreasing function of time. In the exemplary embodiment each time-based nodal variable may be expressed in either of the two forms: (a) the identity record is t seconds old, or (b) the identity record occurred before/after time t. Time-based variables may also be combined to form network-based velocity variables.

c. Risk Tables

Risk tables are generally realized as lookup tables used to convert a categorical feature into a continuous variable. Typically, the categorical feature to be converted will be a function of a categorical variable or parameter capable of assuming a large number of potential values. For example, the categorical feature "home zip code" could be defined with respect to a categorical variable comprised of the first three digits of the home zip code of the identity record of interest. The value assigned to a particular categorical feature will generally be determined by empirical observation of previous fraud rates in identity records associated with particular values of the applicable categorical variable.

d. Fraud Indicators

A previous identity record recorded within the historical identity record database 316 may be marked with any of a number of indicators indicative of the likelihood that the identity record is fraudulent. Generally, a trade-off exists between the accuracy of an indicator (i.e., the percentage of marked identity records that are in fact fraudulent) and coverage of the indicator (i.e., the percentage of all identity record marked as fraudulent). An inverse relationship also generally exists between the accuracy of an indicator and the length of time elapsed prior to applying a fraud indicator to an identity record within the database 316. For example, immediately marking all identity records accorded a fraud score in the upper decile with a fraud indicator would identify most fraudulent identity records and be very timely, but would likely incorrectly mark many legitimate identity records as fraudulent. Conversely, waiting until a written fraud affidavit is received from a consumer prior to marking identity records as fraudulent would result in very high accuracy at the expense of timeliness and coverage. In certain embodiment multiple indicators may be used and the empirically observed trade-off between age, coverage and accuracy may be used to weight the various indicators. By their nature, fraud indicators are typically only used as components of network-based features. Several exemplary fraud indicators are described in Table I.

TABLE I

| Feature of Identity record | Timeliness | Accuracy | Coverage |
|---|---|---|---|
| High computed fraud score | Instant | High | Low |
| Moderate computed fraud score | Instant | Low | High |
| Early high balance | 1 month | Low | High |
| Early high balance with one or more payments missed | 2 months | Moderate | High |
| Early high balance with n or more payments missed | n + 1 months | High | High |
| Investigator classifies case as fraud after attempted verification | >2 months | High | Low |
| Fraud affidavit received | >6 months | High | Very low |

The particulars of the business involving the applicable identity record will affect the relationship between the timing, accuracy and coverage of the indicators described in Table I. For example, in certain business environments the costs associated with fraud investigation may be sufficiently high that it is only very infrequently worthwhile to pursue the acquisition of a fraud affidavit. As a consequence, the true coverage of fraud affidavits in these business environments is even narrower than is indicated above. Similarly, in a very high threat environment, even a moderately high computed fraud score may simultaneously achieve acceptably high accuracy and coverage.

e. Network-Based Features

The set of all historical identity records form multiple graphs $G_\chi = (N, A)$, where N corresponds to a set of nodes (i.e., a "nodeset") representative of the set of all identity records and where A corresponds to a set of edges ("edgeset") composed of pairs of nodes sharing a common identity-related characteristic $\chi$ (e.g., name, social security number or telephone number). An edge may even appear when the common characteristic is not exactly duplicated, but is at least substantially similar, at each node. All of the graphs $G_\chi$ may be combined into a single labeled graph G. As mentioned above, embodiments of the invention are effected using a set of techniques based upon Graph Theoretic Anomaly detection, and the graphs G and $G_\chi$ form the basis for such detection.

Any graph G' with nodeset $N' \subset N$ and edgeset $E' = \{(n_1, n_2) | n_1 \in N' \wedge n_2 \in N'\} \subset E$ that is a valid subset of the edges in G is known as a sub-graph of G. The distance between two nodes is the number of edges that must be traversed to get from one node to the other. The neighborhood of radius r around a node n is the set of nodes that are at most r steps from n. In accord with the invention, all of the graphs G and $G_\chi$ will be directed acyclic graphs since links within the inventive network of linked identity records are inherently directed from new identity records to older ones.

Determining a value of a given network-based feature involves computing a function $f$ of the values of nodal or networked features for all identity records in the single-step neighborhood of the original identity record in some graph $G_\chi$. The network-based feature is completely specified by choice of function $f$ and graph-defining characteristic $\chi$. The value of the function $f$ typically corresponds to the number of identity records possessing a characteristic having a value bearing a predefined relationship (e.g., greater than) to a particular threshold, or the sum of the values of characteristics for the linked identity records. In more sophisticated embodiments, the value of a network-based feature may be determined by estimating the volume of a sub-graph of a certain radius centered upon the current identity record. These more advanced embodiments may use functions which depend on having previously recorded the value of some other network function at all identity records in the neighborhood. If function $f$ is defined by referring to the recorded value of function g, then the value of $f$ will inherently depend on nodes within a "two-step" radius neighborhood rather than just the single-step radius neighborhood. This composition may be repeated to any desired depth, and may also involve recursive use of $f$. Thus, if $f$ computes the union of the values of g in the neighboring nodes and g is the set of neighbors, then $f$ computes the set of nodes within two steps of the current identity record. An approximate value can be had by using a fixed-size surrogate for the sets (e.g., a hashed bit-set).

Each network-based feature may be classified based upon two key characteristics; namely, (i) whether it is locally or distally-centered, and (ii) the number of intermediate values it requires be maintained. Locally-centered refers to features that are conceptually centered on the current identity record and typically refers to features that focus on the combination of features from all linked identity records. Distally centered features are those that are conceptually centered on an identity record other than the current one. Since all network-based features have to be expressed ultimately in locally-centered form in order to permit computation of a final fraud score, distally centered features are usually implemented as threshold functions used to detect the presence of some network feature at a linked node. As an example, a distally centered feature could identify the linkage, via a common telephone number, of the current identity record to a cluster of identity records associated with a common address and a high fraud rate. In this case the focus is on the distal cluster of identity records rather than upon the current (local) identity record. A descriptive listing of an exemplary set of network-based features is set forth in Table II.

TABLE II

| Name | Definition | Note |
|---|---|---|
| Num_bad_ssn_linked | Number of records matched with the bad SSN | |
| Num_name_match | Number of records matched with the name | can be used to normalize num_name_match_only |
| Num_ssn_match | Number of records matched with the SSN | can be used to normalize num_ssn_match_only |
| Num_name_match_only | Number of records matched with only the name | same name different all other keys |
| Num_ssn_match_only | Number of records matched with only the SSN | same SSN different all other keys |
| Num_name_uniq | Number of unique names matched | linked by any other keys |

The amount of data necessary to be retained within the historical identity record database varies among different network-based features. All network-based features within a single "link" of the current identity record may be implemented without intermediate storage. The computation of functions of a larger neighborhood require the definition of multiple levels of functions (such as the functions $f$ and g described previously), as well as the storage of the output of each function except the last one. However, efficiency considerations may dictate the caching of results beyond strict necessity, especially if such results would have naturally been computed when the related identity records were first encountered.

f. Propagation of Suspicion

In certain cases it may be useful for a network variable to be aware of whether a particular linked identity record actually resulted in fraud, or had been marked by one of the more timely but less accurate fraud indicators described above (e.g., early high balance). Accordingly, information relating to this type of identity record status will often be cached for use by the network variable. However, network relationships among known fraud indicators should be evaluated very carefully, since the incidence of fraud associated with application for consumer accounts has been found to be sufficiently high that virtually every application is connected to known fraud by a surprisingly small number of links.

It is observed that propagation of suspicion throughout a network of linked identity records of the present invention is necessarily causal, and therefore may propagate only in the direction of past identity records. Importantly, the propagation of suspicion can be implemented as a single pass algorithm in which each identity record is examined only once. This system characteristic permits scaling to commercially-required sizes and throughput rates.

g. Time-Based Features

Each time-based nodal feature may be utilized in a network context in order to create temporal network-based features. In particular, this usage gives rise to temporal network-based features, also termed "velocity variables." Each such feature consists of a number of identity records which have existed for less than a predetermined period of time (t) and which are linked by a particular characteristic. All network-based features which are premised upon counting the number of identity records satisfying some predefined criteria may be expressed as velocity variables for very large values of t. Velocity variables are primarily useful for the detection of fraud patterns before the high-coverage fraud indicators of the type described in Table I have had time to stabilize. For example, consider the case in which various higher-accuracy fraud indicators (e.g., "2-payments-missed") have had insufficient time to mature and in which low fraud scores were assigned to various earlier identity records linked to one or more current identity records. Accordingly, the current identity record under consideration fails to show links to known fraud indicators. In this case velocity variables may be helpful by identifying an anomalous pattern of linkage to recent non-fraud identity records. However, once the high coverage, high-accuracy indicators (e.g., the 2-payments-missed indicator) have matured, linkage to known fraud will tend to make velocity variables superfluous. This consideration bounds the typical maximum useful time for velocity indicators to the minimum time required for stabilization of the high reliability fraud indicators.

i. Small Diameter Graphical Pattern Matching

In the computation of network-based features, it is possible to propagate values more than one step at a time. In fact, values may be propagated inward to the new identity record from as large a sub-graph of related identity records as may be feasibly extracted at a given time. At least two types of consequences accrue from this propagation characteristic. First, the scope of data that must be kept in intermediate values for the detection of certain kinds of patterns can be decreased. Second, the range of patterns that can be detected without any intermediate storage whatsoever is substantially increased. However, it is observed that the feasible range for such increased radius of direct search is generally limited by the exponential increase in the cost of conducting the search. Specifically, the cost of retrieving identity records related to the current identity record by more than two or three intervening links typically becomes economically infeasible, thereby resulting in detection of only those patterns which may be ascertained by propagating intermediate values.

j. Fuzzy Cluster Size Spectra

One of the simplest network metrics contemplated by the invention involves examination of a set of related identity records to determine how many unique versions of certain identity information exist in the set. One way this may be effected is by performing agglomerative clustering with respect to the values of one of these identity fields. Specifically, this is performed by using progressively more liberal thresholds in determining whether these identity fields have the same (fuzzy) value. If the values are highly distinct, the number of clusters will be approximately the same as the number of related identity records until the threshold is so liberal that all identity records collapse into a single cluster. If the values are predominantly approximately the same, the number of clusters will collapse to a very small number for even relatively strict matching thresholds. The threshold values, the number of thresholds and the comparison operation may be tuned to obtain the best fraud detection performance. In the exemplary embodiment the identity-related characteristics which have been found to be most interesting for this sort of comparison are name, address and social security number, since these characteristics are all subject to manipulation by fraud artists. Agglomerative clustering is generally described in, for example, *Finding Groups in Data: An Introduction to Cluster Analysis*, Leonard Kaufman, Peter J. Rousseeuw, ISBN: 0-471-87876-6, JW Wiley, 1990.

One convenient metric for approximate equality of strings such as names, addresses and social security numbers is n-gram matching. Consistent with this method, strings to be compared are broken down into all overlapping short substrings of a particular length (typically approximately three characters). These substrings are usually weighted by their frequency of occurrence in typical strings. Match credit is given for common substrings and penalties assessed for substrings that are found in only one of the strings being compared. This method of n-gram matching can be made to approximate the results of edit distance metrics also known as Levenshtein metrics (see, e.g., Dictionary of Algorithms and Data Structures, http://www.nist.gov/dads/), but edit distance is typically much more expensive to compute than n-gram matches.

In the exemplary embodiment the relative number of related identity records within the clusters associated with a set of progressively more liberal clustering thresholds may be considered in conjunction with other feature variables in order to determine a likelihood of fraud. In addition, the difference or ratio of different cluster sizes may also be utilized in detecting evidence of deliberate manipulation of various characteristics of the related identity records. For example, a dramatic change in cluster size as the clustering threshold is expanded is often indicative of such deliberate manipulation. This is because the typically small, gradual changes made to identity records which have been deliberately manipulated will often suddenly cause the modified records to be "collapsed" into a single cluster once the clustering threshold has been sufficiently liberalized to encompass the modifications.

Figure 6:
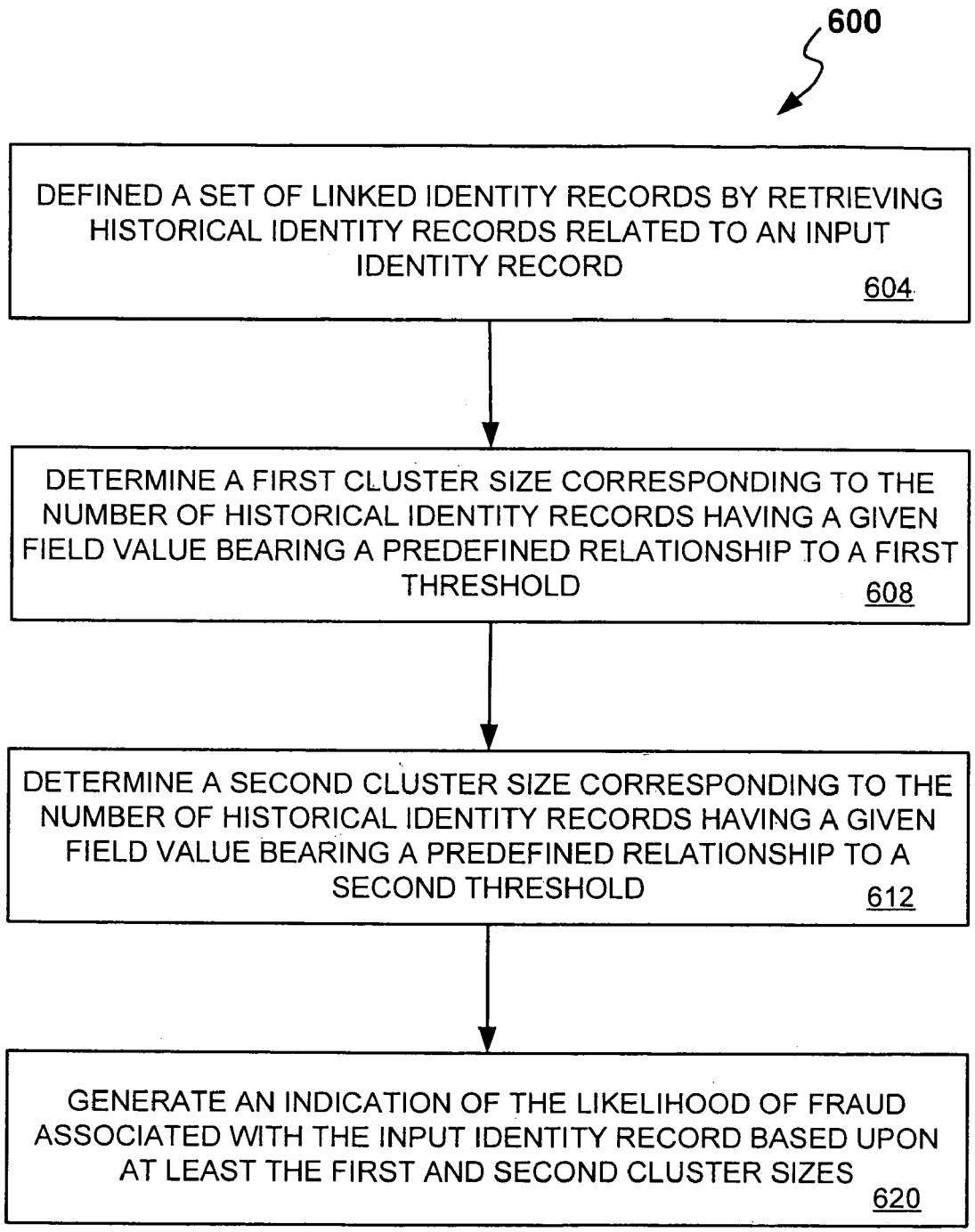
FIG. 6 depicts a flowchart representative of a fraud detection technique of the present invention which is premised upon evaluating the relative sizes of fuzzy clusters of related identity records.

FIG. 6 depicts a flowchart representative of a fraud detection technique 600 of the present invention which is premised upon evaluating the relative sizes of fuzzy clusters of related identity records. The representation of FIG. 6 assumes that an input identity record has been previously selected and that it is desired to determine a likelihood of fraud associated with such input identity record. A set of linked identity records is then defined by retrieving historical identity records related to the input identity record (step 604). A first number, or "cluster size", of the linked identity records which have values of a selected identity field bearing a predefined relationship to a first threshold are then determined (step 608). At least a second number of the linked identity records having values of the selected identity field bearing a predefined relationship to a second threshold are also determined (step 612). In general, additional cluster sizes will also be computed by gradually increasing the applicable threshold. An indication of the likelihood of fraud associated with the input identity record is then generated by comparing or otherwise evaluating the cluster sizes associated with each threshold (step 620). For example, in one embodiment each of the cluster sizes is compared to a total number of the historical identity records included within the set linked identity records. In other embodiments differences between the various cluster sizes are computed and analyzed. Similarly, estimating a likelihood of fraud may entail determining ratios between ones of the cluster sizes.

5. Meta Features

Meta-features comprise the functional combination of other features, such as nodal features and network-based features. There are several reasons to utilize meta-features within the fraud detection model of the invention. One such reason is to incorporate non-linearity into fraud detection modeling structures which would otherwise use linear decision surfaces.

Another reason is to provide scaling of variables in a way that is more natural to the interpretation of the variables. For example, it is generally easier to interpret probabilities after transformation by a logarithm.

In certain embodiments of the invention the incorporation of non-linearity into a fraud detection model is accomplished in a generic fashion by initially introducing all second-order combinations of variables as well as the log transformation of all variables. An advanced technique such as SVM's or ridge regression is then used to determine which nonlinearities are useful and which are superfluous.

a. Cross-Check Features

Cross-check features are an important class of meta-feature is in which two or more other features are examined for compatibility. The comparison of area and zip codes for geographic compatibility provides an example of such a cross-check feature. Another commonly used cross check feature results from the comparison of birth date and social security number issue year.

b. Functional and Table-Based Features

One useful class of meta-features is the set that may be defined based on simple operations involving table lookup and a reasonably small collection of mathematical operations. For instance, isMobilexomePhone*isMobileworkPhone is a feature that expresses the fact that both home and work phones are mobile numbers. Similarly, nameMatchFraud/nameMatchTotal is a feature which expresses the total number of known fraud identity records that have the same name as a fraction of the total number of identity records that have the same name.

Table lookups are useful for exploding a categorical variable into multiple binary variables. For example, Table III below converts a single categorical variable expressing address type into two binary variables which express the salient characteristics of the address type:

TABLE III

| Address Type | Suspicious? | Expect Multiple Residents |
|---|---|---|
| Apartment | 0 | 1 |
| Office | 1 | 1 |
| Residence | 0 | 0 |
| Mail Drop | 1 | 1 |
| Prison | 1 | 0 |
| Mental Health Facility | 1 | 0 |

6. Final Generation of Fraud Score and Reason Codes

As mentioned above, the fraud detection technique of the present invention contemplates examination and detection of features inherent within a graphical representation of the links between a current identity record and plural identity records within the historical identity record database 316. The presence or absence and degree of strength of these graphical features is then considered during final fraud detection model evaluation 407 (FIG. 4). This model evaluation typically consists of both score generation and reason code computations. Score computation is generally effected using a non-linear or linear regression model operative to combine a set of inputs comprising the presence/absence and strength of the above graphical features into a single score. The reason code computation typically consists of multiple regression steps combined with threshold comparisons and a logical rule structure that allow the presence or absence of a particular reason code to be determined. The reason codes are intended to aid a fraud investigator in confirming the presence or absence of fraud. Several examples of possible reason codes are given in Table IV.

TABLE IV

| Code | Description |
|---|---|
| 007 | No Anomalies detected |
| 040 | Statistical pattern OK |
| 131 | Address Suspicious - Manipulation Possible |
| 160 | Address is commercial address |
| 161 | Address is Non-residential |
| 165 | Address is Correctional Facility |

The present invention also contemplates that potential frauds can be predicted on the basis of the pattern features inherent within a graphical representation of the links between a current identity record and plural historical identity records (i.e., "GTAD patterns") in combination with the existence of one or more early indicators of fraud. As was mentioned in the Background of the Invention, potential frauds are often not identified in a sufficiently timely manner by credit grantors. By evaluating early fraud indicators in combination with GTAD patterns, embodiments of the present invention are capable of identifying potential frauds without in a way that does not require that model training be predicated upon knowledge of the prior occurrence of actual frauds (which is generally of critical importance to conventional fraud detection techniques).

A variety of early fraud indicators may be considered either alone or in combination when embodiments of the invention are employed for fraud detection in the manner described above. Such fraud indicators may include, for example, (i) high computed fraud score, (ii) moderate computed fraud score, (iii) early high account balance, (iv) early high account balance with one or more payment missed, (v) early high account balance with n or more payment missed, (vi) case is classified as fraud by investigator following attempted identity verification, and (vii) fraud affidavit received. In general, embodiments of the present invention will be configured to consider these types of fraud indicators to the extent associated with a related historical identity record. When combinations of such fraud indicators are utilized, each indicator may be weighted in accordance with its recency, estimated accuracy and/or predictive strength prior to being considered in combination with the applicable GTAD patterns.

Figure 7:
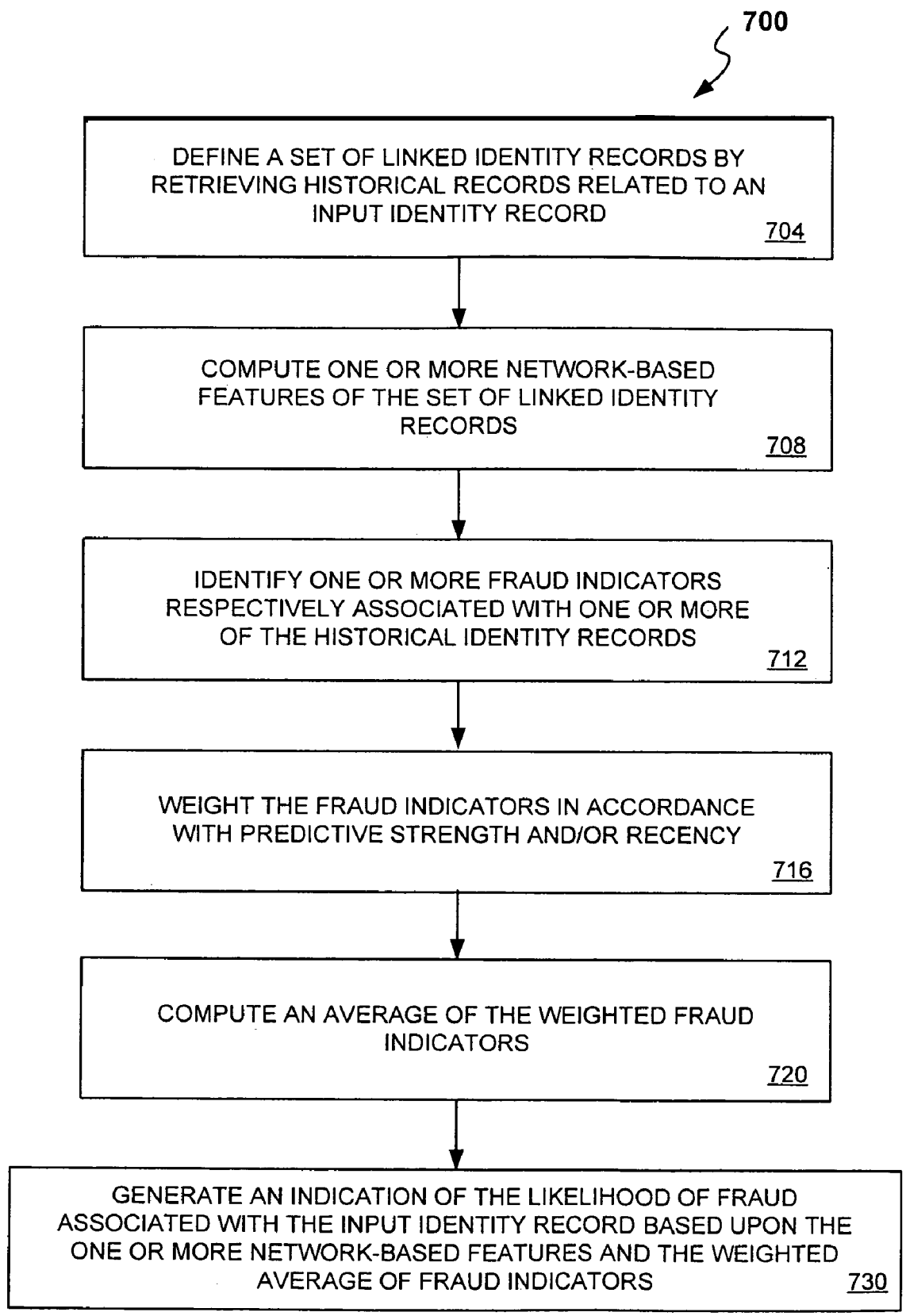
FIG. 7 depicts a flowchart representative of a fraud detection technique of the present invention which is predicated upon consideration of GTAD patterns in combination with one or more early fraud indicators.

Turning now to FIG. 7, there is shown a flowchart representative of a fraud detection technique 700 of the present invention which is predicated upon consideration of GTAD patterns in combination with one or more early fraud indicators. The representation of FIG. 7 assumes that an input identity record has been previously selected and that it is desired to determine a likelihood of fraud associated with such input identity record. At this point historical identity records related to the input identity record are retrieved so as to define a set of linked identity records (step 704). One or more network-based features of the set of linked identity records are then computed (step 708). In addition, one or more fraud indicators respectively associated with one or more of the historical identity records are identified (step 712). When more than a single fraud indicator is identified, ones of the identified indicators may then be respectively weighted in accordance with a predictive strength and/or recency associated with each of the indicators so as to generate a plurality of weighted fraud indicators (step 716). An average of these weighted fraud indicators is then computed (step 720). An indication of the likelihood of fraud associated with the input identity record is then generated based upon the one or more network-based features and the weighted average of fraud indicators (step 730).

7. Mathematical Underpinnings

The inventive fraud detection system has a number of implementation and scaling properties that stem from the mathematical underpinnings of the system architecture. These properties allow the inventive system to operate in real-time at very high transaction rates while still providing the modeling system with the ability to use of features dependent upon the presence or absences of graphical patterns in a large neighborhood around a current identity record of interest.

a. Adjacency Matrix

The edgeset of a graph can be described by the so-called adjacency matrix (see, e.g., Graph Theory, Frank Harary, Addison-Wesley, 1994). The adjacency matrix is a matrix that has a row and a column for each node of the applicable graph theoretic structure. The element $a_{ij}$ in the $i^{th}$ row and $j^{th}$ column of the adjacency matrix A is generally non-negative and is zero if node is not connected to node j, and one if node i is connected to node j.

Many mathematical properties of the adjacency matrix have interesting interpretations relative to the graph that the matrix represents. One example is that the number of paths of length n in a graph is $\Sigma_i \lambda_i^n$ where the $\lambda_i$ are the eigenvalues of A.

In many practical implementations of the fraud detection scheme of the invention it is anticipated that the graphical representation of linked identity records will be extremely large. For example, a prototypical implementation of the invention has been developed and used to examine 200 million credit and other applications and to retain nearly 100 million of such applications. As a consequence, the adjacency matrix characterizing the resultant network of linked identity records contained approximately 1016 elements. If, however, each connection were simply encoded using a single bit, then the resultant matrix would require an impractically large amount of memory space.

b. Sparsity and Locality for Retrieval

The adjacency matrices generated in connection with many practical implementations of the network of linked identity records contemplated by the inventive fraud detection system will generally be too large to feasibly store explicitly. One well-known method of manipulating very large matrices involves storage of only the non-zero elements of the matrix. In the case of a particular adjacency matrix currently under consideration for use in the inventive system, each row or column of the matrix contains only approximately 10 to 50 non-zero elements, which may yield a reduction in matrix size of up to 7 orders of magnitude. Using a sparse representation, this adjacency matrix requires approximately 4 bytes per non-zero element, which enables the entire matrix to be represented using less than 10 gigabytes.

However, in practical implementations of the inventive fraud detection system it is anticipated that additional auxiliary data will be stored and associated with each node, and possibly also with each edge, in the graphical representation of the network of linked identity records. That is, it is anticipated that auxiliary data other than that merely indicating the presence or absence of an edge between two nodes will be stored. Moreover, this auxiliary data must not only be capable of being stored; rather, all such auxiliary data corresponding to the area of the graph within a certain radius of a given node must be retrieved within a very short period of time.

A simplified example relating to the storage and retrieval of such auxiliary data within the context of the inventive fraud detection system will now be considered. The specific problem considered in this example is that of identifying all of the nodes connected to a center node of a linked identity record graph by any of similarity of name, social security number, address or phone number. It is further desired to find all of the nodes connected to the nodes identified above by social security number, address or phone number and which have some level of suspicious activity. If a conventional sparse matrix storage scheme were employed, the sparse index numbers associated with the original node would likely be read in a single access, but much of the auxiliary data associated with the connected nodes would typically be scattered throughout a very large file. This would require thousands of disk accesses, consuming an unfeasibly large amount of time, in order to obtain a relatively small number of bytes of such auxiliary data.

c. Decomposition, Permutation to Block-Diagonal or Band-Diagonal Form

Consistent with the invention, decomposition and block-diagonalization of adjacency matrices is performed in order to enable rapid computation of network-based features of linked identity records. As was discussed above, the relative sparsity of adjacency matrices renders them difficult to explore in a computationally feasible manner. Accordingly, the present invention contemplates that the applicable "fuzzy match" adjacency matrix be decomposed into several sub-matrices, each based upon a given identity element (e.g., name, address, social security number, phone number, driver's license number). In addition, localization of the identity-related data stored within these adjacency matrices may be enhanced through block diagonalization of these adjacency matrices. Through application of these techniques, the present invention renders the computation of network-based features computationally feasible. A more detailed description of these techniques is provided immediately below.

The present inventors have recognized that the problem of non-contiguous disk access in a sparse matrix representation of the adjacency matrix and related auxiliary data could in principle be resolved if the adjacency were transitive, that is if node j is connected to nodes i and k, then nodes i and k would be connected (i.e. if $a_{ij} \wedge a_{jk} => a_{ik}$). This is equivalent to saying that the adjacency matrix A is block diagonalizable. A similar property holds if A is only band diagonalizable because the linking is due to a fuzzy matching. It may be readily appreciated that this will generally not be true within the context of the inventive fraud detection system, since a credit or other consumer application j can quite easily share an address with another application i, and a phone number with yet another application k, and yet have i and k be completely dissimilar. An adjacency matrix will be block diagonalizable whenever the links are due to an exact match on a single key. It will be band diagonalizable if a fuzzy matching operation is used that follows the triangle inequality, but the diagonalization will depend on a more general operation than simple sorting.

The adjacency matrix A can, however, be decomposed into sub-matrices, each of which is block band diagonalizable. In the context of the inventive fraud detection method, each of these sub-matrices corresponds to a kind of relation such as identity of social security name or similarity of address. This decomposition can be written as:

$$A = \sum_i P_i B_i P_i^T$$

where i ranges over the different kind of relations expressed in A, and the $P_i$ are permutation matrices which cause the matrices B to be band-diagonal. This allows the single large, non contiguous disk access which would otherwise be required to form a sub-matrix of A to instead be effected through a small number of contiguous disk accesses. These contiguous disk accesses form the corresponding sub-matrices of each of the $B_i$, which are then combined to form the required sub-matrix of A.

d. Implementation

In practice, the contents of A are implicit in the individual historical identity records associated with the nodes of the graph of linked identity records. Accordingly, two identity records can be compared directly in order to determine if they have the same or similar addresses. Moreover, when related identity records are found, only the identity record information need be returned; the details of the connections can be left implicit. These two observations allow the band-diagonalization described in the previous section to be done by taking a file containing all of the historical identity records that define A and the node-associated data, adding a sequence number to each identity record, and duplicating the resultant file containing sequence numbers once for each of the kinds of links in A. Each copy of the identity record file is then sorted according to the field defining a given link, and an index on that field is created.

In this data structure, each separate copy of the data and the links implicit in that data correspond to one of the $B_i$, the indices on each differently sorted copy correspond to the $P_i$ and the sequence numbers (deranged by the sort) correspond to the $P_i^T$. Finding all identity records similar to a given identity record involves searching the indices associated with each of the identity fields of the given identity record, reading a contiguous range of identity records with respect to each such index, and merging the results back together into a single resultant set of similar identity records. The entire data structure is not optimal with respect to space since it maintains multiple copies of the data, but the benefits in terms of speed will generally outweigh the space cost.

Figure 5:
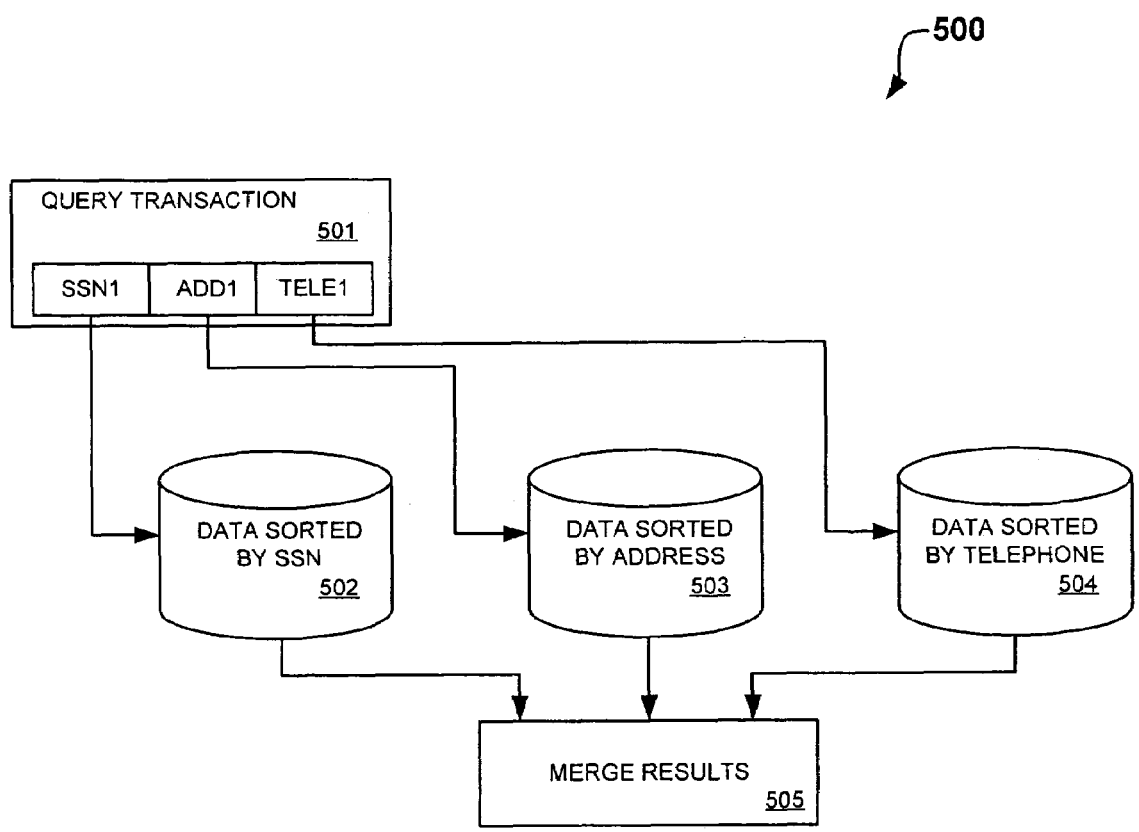
FIG. 5 illustrates a simplified process for identifying all historical identity records within a set of linked historical identity records that are similar to a given identity record.

FIG. 5 illustrates a simplified process for identifying all historical identity records within a set of linked historical identity records that are similar to a given identity record. In the example of FIG. 5, it is contemplated that the set of linked historical identity records are amenable to representation by an adjacency matrix in the manner described above. More specifically, the exemplary process of FIG. 5 contemplates that the adjacency matrix is generated so as to represent a graphical network formed on the basis of such linked records and is decomposed into a set of sub-matrices, each of which is represented as a file indexed as a function of the identity parameter (e.g., telephone number) associated with the applicable sub matrix. In the example of FIG. 5 these files include a first file 502 indexed as a function of social security number, as second file 503 indexed as a function of address, and a third file 504 indexed as a function of telephone number.

Referring to FIG. 5, an identity record acting as a query 501 is decomposed into individual query components of social security number, address and telephone number. These individual components are then used to respectively access the first file 502, second file 503 and third file 504. The results from each of these files 502-504 are read contiguously starting at an offset found in an index file (not shown) associated with each of the sorted data files 502, 503 and 504. The three results are then merged 505 to form a single result.

e. Update Methods

The multiple sorted and indexed files described in the previous section provide very high performance retrieval, but tend to be costly to update. Two types of such updates occur within embodiments of the inventive fraud detection system. In the first, new identity records entering the fraud detection center 110 are stored and must be retrieved when subsequent linked identity records are received. Secondly, fraud "tags" associated with previously stored identity records which are found to be suspicious at some later date are updated to reflect the appropriate degree of suspicion.

With respect to updates of the first type described above, it has been found to suffice to retain new identity records entering the fraud detection center 110 within a conventional indexed retrieval database. Newly-received identity records are retained in this manner until the number of identity records so retained is sufficiently large that the amortized cost of merging these retained identity records with existing sorted files is low enough so as to be economically feasible. For example, in certain embodiments it has been found that newly-received identity records can be retained in this manner for up to a week.

Updates of the second type mentioned above, in which the state of a fraud tag associated with the applicable identity records is changed, are handled similarly. In particular, a relatively small conventional database within the fraud detection center 110 may be used to store a set of fraud tags associated with all stored identity records. Fraud tags within this stored set may then "override" the fraud tags nominally associated any identity records in the results 505 obtained from the main database within the fraud detection center 110 before returning these results 505.

The cost of this over-riding operation may be made arbitrarily small by only keeping recent updates to the fraud tags in the conventional database; older updates can be made to the main database at the same time that new identity records are merged into their proper places. Since the merge process requires copying from the main database, updating the fraud tags at the same time involves no incremental cost.

8. Graph Anomaly Detection

As described, fraud can be detected in relation to specific application by developing links to historical application data and then looking at the graphical pattern of links to determine if the graph resembles a graph that would be associated with a fraudulent application. If the graph is highly similar to a fraudulent graph, then a score can be generated and returned indicating that there is a high likelihood that the application is fraudulent. Conversely, if the correspondence with a fraudulent graph is low, then a score can be generated and returned indicating a low likelihood of fraud.

It should be noted that the system and methods described herein, including those to be described in this and subsequent sections, can apply to any type of identity based enrollment or application. For example, while many of the examples described herein are related to some sort of account application, such as a credit card application, the systems and methods described are also capable of being applied to applications for unemployment insurance, tax returns, Internet based transactions and registrations, to name just a few. Thus, the term new account application can refer to any type of identity based enrollment or application. Further the new identity records referred to herein can be associated with any type of identity based enrollment or application.

Another approach for detecting fraud in accordance with the systems and methods described herein is to determine, or establish, what a normal graphical pattern should look like. When a new input identity record 203 is received, statistical analysis can be performed on the links generated in order to determine if the graph associated with the new identity record varies significantly from what a normal graph should look like. This type of analysis can be termed anomaly detection. In other words, anomalies in relation to the established normal graph are detected and, e.g., used to develop a fraud score 206. This can be useful because anomalies, as described above, can be indicators of probable fraud. In one embodiment, anomaly detection can comprise the following steps: mathematically establishing normal graph patterns, deriving statistical models from the normal graph patterns, performing statistical analysis and anomaly detection for a new user identification record 203, derive predictive models and/or rules for detecting fraudulent patterns. In another embodiment, anomaly detection can be done by applying domain knowledge directly to form additional rules that detect fraudulent patterns.

a. Establishing the Normal Pattern

The basic techniques for establishing a normal pattern have been described in detail abode. As mentioned, systems should be employed to limit the neighborhood of historical identity records that will be used to establish the graphical pattern for the new user identity record. The key, clearly, is to define the neighborhood so that it includes a sufficient number of historical records to ensure a high fraud detection rate, with minimal false positives, while also ensuring that the neighborhood is not so large as to make practical computational speed and overhead unrealistic.

For example, as described above in section 7, the edges of a graph can be described using an adjacency matrix. Use of the adjacency matrix representation allows for the clustering, or localization, in relation to certain data and certain data values and the use of sparse representation for the data. The requisite neighborhood is defined by the various links, including indirect links, established with respect the fields in the new identity record 203. Accordingly, use of clustering and sparse representation techniques can allow quick, efficient, and manageable retrieval of the neighborhood of related historical identity records required to generate a score 206 based on detection of an anomaly.

As explained, the links are determined based on matches within the data fields of the various user historical identity records, e.g., stored in database 316. But as also mentioned, the matches can be hard matches, i.e., true or false, or fuzzy matches, where the degree of matching is given a weight. The use of fuzzy matches can allow greater ability to detect fraud as well as the more efficient processing of the data to determine a fraud score 206. For example, as explained in section 7.c, fuzzy matching allows the adjacency matrix to be decomposed into sub-matrices, e.g., for each identity element being considered.

It should be noted that the definition of the applicable neighborhood should be adaptive and changed as required based on the values or information associated with the various fields in an identity record 203.

b. Developing the Statistical Model

Once a normal graphical pattern is determined, it should be statistically modeled to allow for statistical analysis of a new identity record to determine whether it is associated with a high likelihood of fraud. Statistical models can, depending on the embodiment, be developed using case studies and/or statistical analysis of historical data. For example, fraudsters in a fraud ring often develop techniques which purposefully do not exhibit strong characteristics of single identity theft in an effort to defeat fraud detection techniques. However, when the activity of the fraud ring as a whole is investigated, several indicators can be seen. From those indicators, criteria for normal vs. anomalous patterns can be developed.

As an example, case study has revealed that fraud rings often exploit the discovery of a good SSN, by having each of their fraudsters make credit applications all using the same SSN. In order to avoid the appearance of a single identity theft, these fraudsters might use different names. Because these fraud rings are typically local in scope, these names are often somehow closely associated, such as by the same or proximate zip codes and/or area codes. Additionally, similar addresses are often used possibly with slight variations such as misspellings or the use of "Street" rather than "Avenue." These variations could unwittingly be attributed by client institute 130 as a simple clerical error. For example, an address at "Calston Way" is often mis-transcribed over the phone as "Carlston Way" or could easily be written as "Calston Road." The hope of the fraudster is that the variation is not sufficient to arouse suspicion but sufficient to distinguish two applications under different names when conventional fraud detection schemes are employed. But a case study of past fraud rings can reveal these techniques and can be used to establish statistical models for evaluation of new identity records.

For example, by using the case study approach, the patterns described in the following paragraphs have been shown to stand out. Thus, by statistical defining a neighborhood that incorporates the identity fields and related identity records needed to detect the following patterns, fraud can be detected using the systems and methods for anomaly detection described herein.

A first pattern is keyed off of multiple names associated with the same Social Security Number (SSN). Simply defining the neighborhood as all names with the same social security number can be too broad depending on the implementation. But a pattern can, for example, be defined based on whether each name is in close geographic proximity, e.g., whether the associated addresses are the same or similar or very near each other, and by the degree of similarity between the names. Thus by narrowing the definition, a useful pattern can emerge. As another example, fraudsters often apply for wireless telephone accounts in order to establish a credit history under a false identity using a valid SSN, followed quickly by a credit card application using the same identity and SSN. Thus, such a pattern can be indicative of fraud and can be used to detect anomalies related to a new identity record 203.

Additionally, in certain embodiments, the true owner of an address or phone number can be verified by a truth file. If the address owner doesn't match or if the name on an application doesn't match the address truth file, the likelihood of fraud is high. Such truth files can include consulting a web search engine or database. Thus, truth files can be used to further define the statistical model to be used.

Another pattern is the use of multiple names to the same home address or phone number. Anomalies associated with a multiple names to a single home address include anomalous name variations, such as the exchange of first and last name or variations on the last name, e.g., "David Johns", "David Johnson", and "David Johnston." Use of famous names is another name anomaly.

Other anomalies include variations in the address such as those mentioned above, but also can include abbreviating the address to make it appear different as well as varying the presentation of an apartment number, such "27", "Apt 27", "No 27", "#27", "Suite 27."

Multiple home phone numbers for a single address can be anomalous, particularly if attributed to a single person. Furthermore, fraudsters often use their work phone number as their home phone number. Thus, determining that a number used as a work number is in fact associated with a residence, or is associated with a residence of another, can be an anomaly.

Another anomaly is an excessive number of people attributed to a single address which can indicate a number of false identities. Yet another anomaly relates to the dates of the applications. For example, multiple applications to the same client in the same day from the same name or multiple applications with name variations within a short interval of time such as a few days can be indicative of the activities of a fraud ring. These application patterns present anomalies which can be detected by an appropriate rule.

Secondary considerations that rely on longer link setstween the incoming identity record 203 and historical identity records used to evaluate the incoming identity record, can be developed to aid in detecting anomalous patterns in the associated graphical representation of the identity-related fields/data. For instance, multiple applications with the same name, and possibly other shared data such as address or telephone number, but different SSNs is such an anomaly. Another example of a secondary anomaly is more than one application under more than one name but with the same SSN.

The velocity of segments can also exhibit anomalies. For example, the number of different industries and segments, regardless of client institution 130, that received applications, within a short time period, if excessive can be indicative of a fraud anomaly. Also, an excessive number of applications to a single client over a short period of time can be indicative of a fraud anomaly. The decision codes across segments can also exhibit anomalies. For example, a large number of "Declined" decision codes over a short period of time can be indicative of a fraud anomaly. The differences between decision codes across different industries can also be analyzed to detect anomalies.

Figure 8:
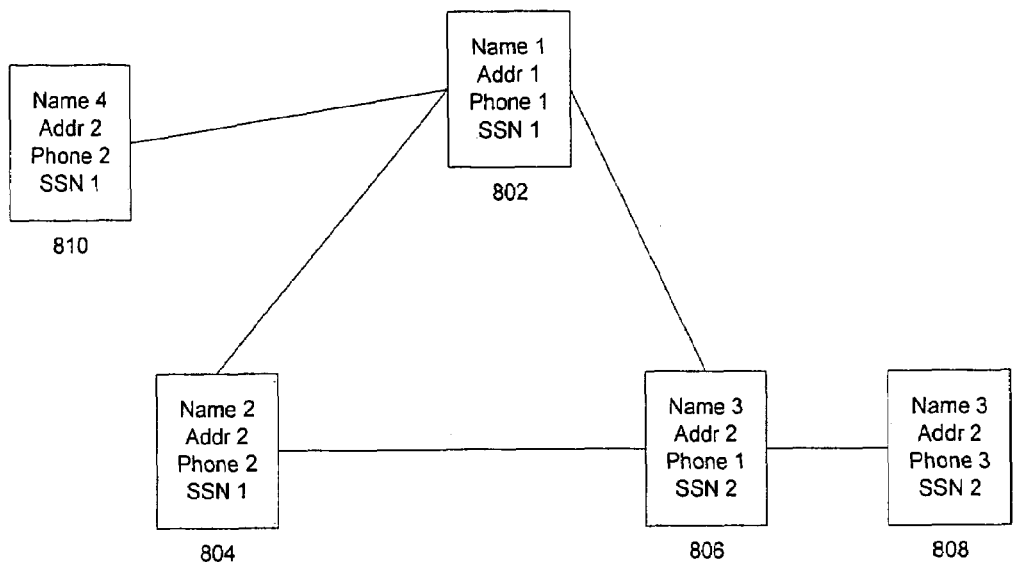
FIG. 8 shows a portion of a graph illustrating characteristics of a fraud ring.

Graph cycles can represent additional patterns that can be associated with fraud rings. FIG. 8 shows a portion of a graph illustrating such a cycle. Cycles are symptomatic of the exploitation of a limited number of valid identity features, such as serial numbers, real phone numbers, and legitimate addresses. In exploiting this limited number of valid identity features, fraud rings, for example, use permutations of identity features, which consequently generate cycles in the corresponding graphs. In FIG. 8, for example, node 802 is linked to node 804 by a common SSN; node 804 is linked to node 806 by a common address; and node 806 is linked back to node 802 by a common home phone number. This cycle of node 802, to node 804, to node 806, and back to node 802 can be an indicator of a fraud ring. Further, node 808 shares a common SSN with node 806 and can be part of the fraud ring. Similarly, node 810 shares a common SSN with node 802. While nodes 808 and 810 do not form a graph cycle, once a fraud ring is identified, being linked to the fraud ring through common identity features in this manner can tie those records to the fraud ring.

Alternatively, or in addition to case studies, off-line statistical analysis of historical data can be used to develop a statistical model that defines a good neighborhood. It should be noted that once the neighborhood is defined, using case study or statistical analysis, it must be validated to ensure that it is in fact sufficient to produce an effective fraud detection rate with minimal false positives. Therefore usually three disjoint data sets are created for the purpose of model building, training, validation, and testing. Models are first trained with the training data set. Then the best model is chosen and validated by the validation data set. If the model is validated to have the desired accuracy level, then it can be considered a valid model. If not, further training can be performed and the process can repeat until the desired level of accuracy is achieved. As a last step, the model is applied to the test set of data to estimate the true performance of the model. Other enhancements to the training and model development can be performed such as data preprocessing to limit the scale of the data to be modeled for computational tractability. Also, techniques to alter the cost of and frequency of fraud can be employed to make the model more proficient at detecting fraud.

9. Applying Domain Knowledge to Detect Fraud

A set of rules can be defined based on domain knowledge to detect fraud. These rules have the effect of narrowing the neighborhood to allow quick and efficient analysis of the data for anomaly detection. These rules are the result of the domain knowledge acquired in analyzing patterns in order to define anomalies.

Domain knowledge generally relates to specific aspects of each of the features, or identity-related fields. For example, knowing that a person under certain circumstances may change their name yet retain the same SSN security number is an example of such knowledge. The rules developed should take into account the possibility that the name change is normal behavior as opposed to fraudulent behavior. The application of domain knowledge to anomaly detection comprises the following aspects: domain knowledge can be used to correlate the strength of anomaly detection to the actual likelihood of fraud, and domain knowledge can be used to reduce the size of the neighborhood that is analyzed.

Domain knowledge can be used to establish the relative strength of fraud. This capability lies in the specifics of the particular domain knowledge. For example, a person is born only once, so having multiple dates of birth (DOB) for a single individual is a strong fraud anomaly. As another example, while it is likely that an individual's home phone number is distinct from their work phone number, it is unlikely that that individual's work phone number coincides with someone else's home phone number; however, this situation is not completely abnormal. Consider a domestic servant who might work exclusively at another person's home. They might list a work phone number that is the same as the home phone number of their employer. But this situation is determined through the analysis to be statistically unusual and therefore it can be considered a weak fraud anomaly.

Figure 9:
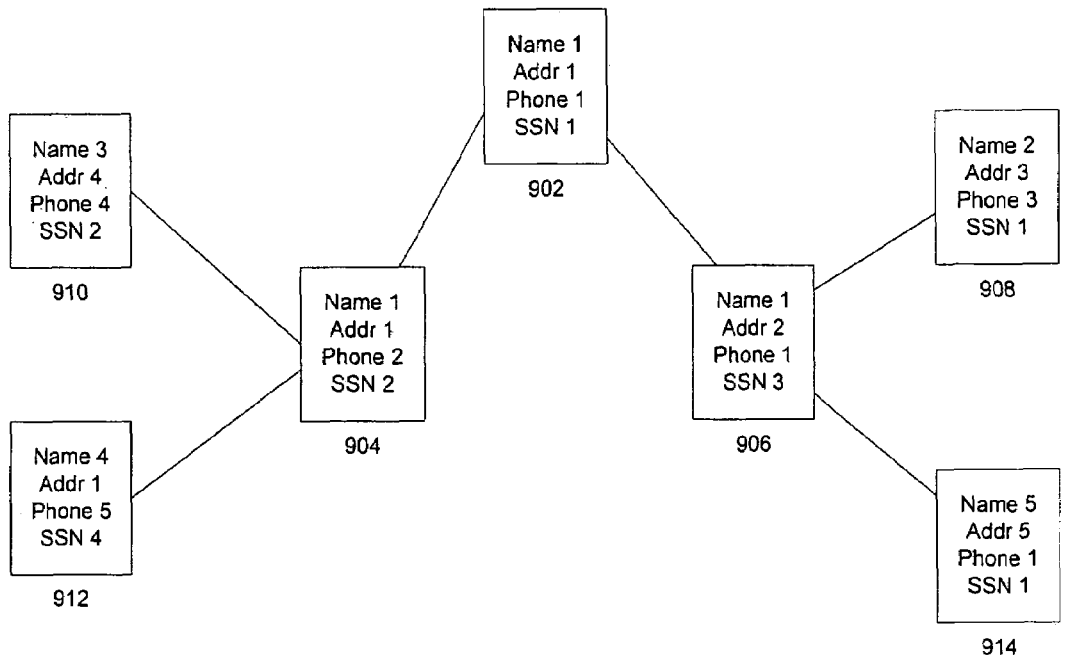
FIG. 9 shows an example of a category of strong anomalies involving multiple SSNs.

Thus, some rules can result in strong fraud anomaly correlation and others weak based on the domain knowledge acquired through statistical analysis and case studies. FIG. 9 shows an example of a category of strong anomalies involving multiple SSNs. Nodes 902, 904, and 906 represent identity records that share the same name but different SSNs. Node 902 is linked to node 904 because they share the same address and name. Node 902 is linked to node 906 because they share the same name and phone number. The link between node 902 and node 904 or the link between node 902 and node 906 are strong anomalies because by sharing the same name and sharing either the same home phone number or same home address, it is likely the persons represented by node 902 and node 904, for example, are the same person. But they have differing SSNs. So if node 902 is the identity record associated with the current application, then the application has a strong likelihood of being fraudulent because the same person cannot have multiple SSNs.

Because this SSN is likely fraudulent, it could, e.g., be used by fraudsters in a fraud ring. Therefore, nodes 908 and 910 bear an indirect relationship with an identity that exhibits a strong anomaly. Similarly, nodes 912 and 914 share an indirect relationship with nodes that exhibit a strong anomaly, because node 912 shares a common home address with node 904 and node 914 shares a common telephone number with node 906.

If the current application is presented by node 912 or 914, then the neighborhood should be narrowed further, e.g., as described in more detail below, to determine if in fact there is a likelihood of fraud. For example, if the home address associated with a fraudster turns out to be a college dormitory, subsequent applications using the same address should not necessarily lead to a high likelihood of fraud. On the other hand, a fraud ring can be associated with a high number of applications coming from a single complex such as an apartment complex. Thus, further analysis can be required to determine if applications coming from such a complex should be tied to known fraud associated with at least one address associated with the complex. Furthermore, there can be a temporal connection between the time of the application and the date of the strong fraud anomaly. A false positive should be avoided, for example, when a person unwittingly inherits the home phone number of a fraudster.

In a similar manner, multiple names attributed to a common SSN under suitable neighborhood narrowing described below is another example of a strong fraud anomaly. Additionally, any identity record associated with a current application that shares a home phone number or home address with a record exhibiting a strong anomaly, such as multiple names using a common SSN, can also be indicative of a strong anomaly. Again, a temporal connection can be added to avoid false positives.

Other examples of strong anomalies include known fraud on a SSN, home address, or home phone number within a give period of time, a SSN issued prior to the DOB, multiple DOB's to the same person, and an SSN to a deceased person. But again, some time of narrowing of the neighborhood of data being analyzed, in order to avoid false positives and reduce unnecessary processing can be need. For example, an application from a deceased person may be valid if the application date is slightly after the date of death. For example, a credit application could have been mailed a day before the person dies, but received at the credit agency days after the person dies. Thus, for example, temporal connections can again be used to avoid false positives.

Figure 10:
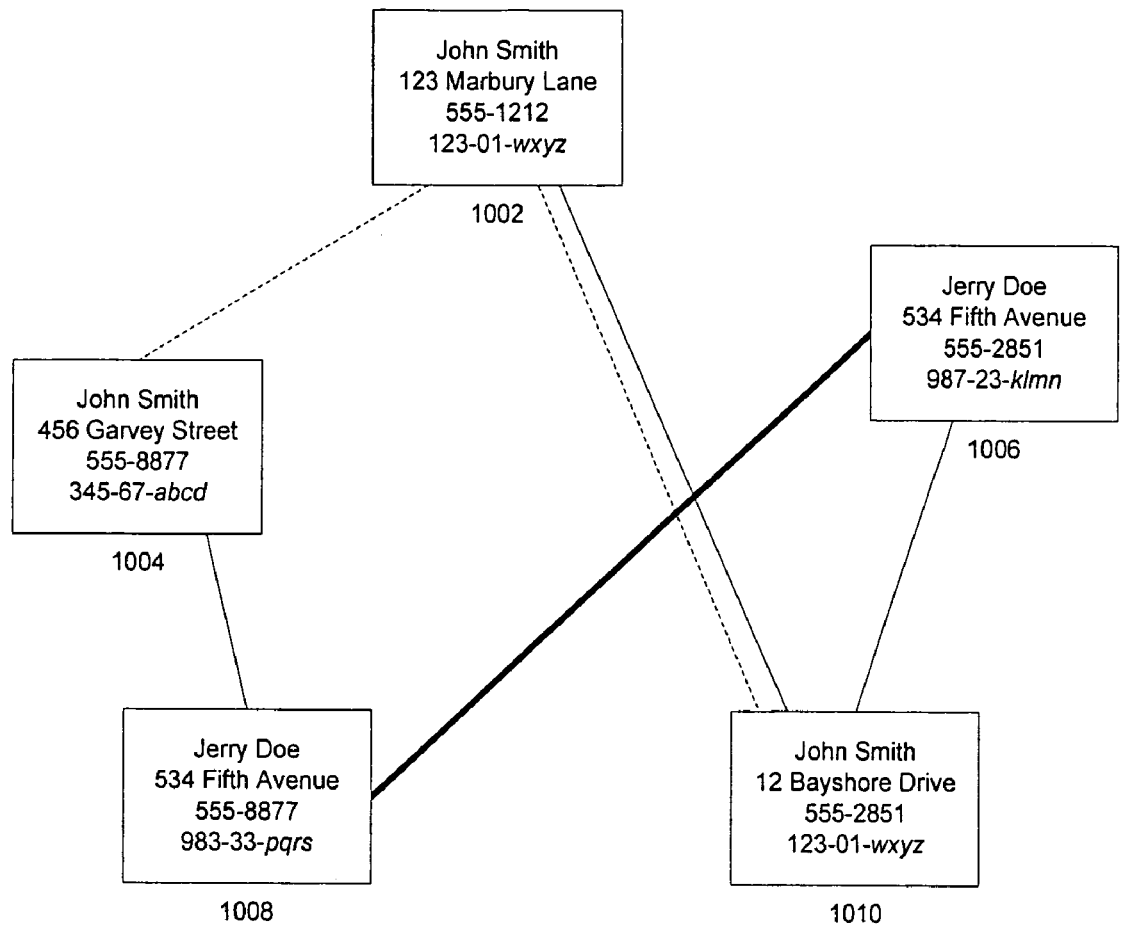
FIG. 10 shows an example of the combination of strong anomaly rules with indirect relationship rules.

FIG. 10 shows an example of the combination of strong anomaly rules with indirect relationship rules. Node 1002 and node 1010 share the same name and SSN, but have different addresses and home phone numbers. They are linked because of the common SSN; however, this link is not considered anomalous because this could be normal behavior, such as when a person moves. Node 1002 and node 1004 are linked by a common name, but this link is not anomalous since it is not uncommon for two people to share the same name. Non-anomalous links in FIG. 10 are shown by dashed lines; however, node 1006 and node 1008 are linked by common name and home address but different SSN's, which that indicates one person is associated with two SSNs. This link is, therefore, an example of a strong anomaly as denoted by a heavy bold line. Also, node 1006 and node 1010 are linked through a common home phone number. Because, node 1006 is tied to a strong anomalous link, the link between node 1006 and node 1010 can be viewed as anomalous due to an indirect relationship. Because node 1002 and node 1010 appear to be the same person, due to the common name and common SSN, and the fact that node 1010 is linked to an anomaly, node 1002 can also be linked to a strong anomaly due to an indirect relationship. This is shown on the graph by the existence of a solid line between node 1002 and node 1010. Thus, indirect relationships, when properly filter can be used to identify anomalies. Such indirect relationships will often be weaker fraud indicators due to the indirect nature of the link. Thus, filtering and/or neighborhood reduction can be needed to ensure that the weaker nature of the indication does not result in too many false positives.

In general, certain types of links, whether indirect or direct, can exhibit varying degrees of anomalous behavior. The spectrum of strength, or weight of anomalous indication extends form weak to strong. Thus, as described, fuzzy representations can be used to determine whether there is a likelihood of fraud. Further, as noted, domain knowledge can be applied to the data set being used to ensure that weaker indications do not result in a high number of false positives and to reduce processing overhead. Accordingly, based on domain knowledge, a weaker set of anomaly rules can be refined, i.e., rules that result in weaker anomalies can be further analyzed to develop stronger indicators. Examples of such rules include rules that identify a person who acquires multiple home addresses or multiple home phone numbers in a short period of time or rules that identify too many people with the same home phone number or home address acquired within a short period of time. Another set of weak anomalies include, rules that identify invalid phone numbers and SSNs, home phone numbers that don't match home addresses, which can be verified through a truth file such as a phone book, matches between the home phone number of one individual to the work phone number of another individual, e.g, when a work phone number is different from a home phone number but matches the home phone number of another or when a home phone number is different from a work phone number but matches the work phone number of another, and when a person changes a home address and within a short period of time changes back to the first address.

Again, with domain knowledge anomalies can be further classified as strong or weak, or in other embodiments they can be weighted. The relative strengths of the anomaly can be used to ascertain the likelihood of fraud, for example, a strong anomaly by itself can be sufficient for a determination of high fraud. However, a weak anomaly by itself might only warrant concern over the current application, but if other anomalies are found, the weak anomaly can contribute to a finding of fraud.

In addition to attributing relative strength to the anomalies, domain knowledge can be used to eliminate links in the graph thereby reducing the size of the neighborhood. A neighborhood that is too large is likely to trigger false positives whereas a neighborhood that is too small is likely not to catch fraud. So by starting at a slightly larger neighborhood size as established by the mathematical and statistical models mentioned above and reducing the size with domain knowledge a suitable neighborhood size can be found.

There are several broad rules that can be applied to reduce the neighborhood size, or filter the data so that a reasonable amount of data is left for evaluating via rules such as those described above. For example, links based on a common work phone number can be limited or eliminated depending on how many work phone numbers there are. Though some fraud rings work out of a common work place, or location, links to a fraudster through a common work phone number in a large corporation are more likely to produce false positives than to catch additional fraudsters. A threshold value can thus be selected for work phone numbers so that beyond the threshold number, links based on a work phone number can be eliminated. Similarly, certain types of addresses can produced a large number of links such as college campuses, apartment complexes, military bases and large corporations. Based on domain knowledge those addresses can be selected and links based on those common home addresses can be eliminated or reduced via a threshold. It should be clear that other link sets can be reduced, or eliminated, in a similar manner in order to reduce the neighborhood size.

In addition to direct neighborhood size reduction, domain knowledge can be applied to eliminate specific links. As disclosed above, multiple names to a common SSN is a strong fraud anomaly. But in certain instances, such as a legal name change, such a situation can exist without any relation to fraud. Most commonly, a woman can change her last name upon getting married. Thus, a link based on a common SSN can be eliminated if the first names match and there is a strong likelihood that the individual related to the new application is female based on that first name; however, chronology should be taken into account. Several applications under the same SSN filed with different last names can be inconsistent depending on the associated chronology and can still be considered an anomaly. For example, a married woman may have an application history in which she has applied for several account using her maiden name, followed by several application using her married name, which is consistent with normal chronology. Further, the women may then revert to using her maiden name on applications. This is not necessarily abnormal as the women may have gotten divorced. But if applications in both the women's maiden and married name are continually interspersed, then this pattern can indicate attempted fraud.

Rules can be defined to reduce the neighborhood and detect identify fraud. The rules can be defined to serve several purposes. For example, rules can be defined that will filter the data so that the neighborhood is reduced. Rules can also be defined for eliminating and handling indirect links and relationship among the data. Finally, rules can be defined for analyzing and detecting fraud patterns within the remaining data.

10. Network of Historical Identity Records

It should be noted that unlike conventional systems, which typically look at transaction data for a specific client institution without reference to data related to other users or other client institutions, system 100 can be configured to actually aggregate historical data from a plurality of client institutions and use that information to detect fraud. For example, while a conventional system may be able to determine a likelihood of fraud for a given transaction, i.e., based on the historical use associated with a particular account, a conventional system would be unable to detect fraud in relation to a new account application, because there is not history associated with the account. Further, there is typically nothing about a single application that would indicate fraud. It is only when the application is evaluated in relation to historical identity records that fraud patterns begin to emerge as described above. Moreover, by including data from other client institutions 130, which cross several industries in both vertical and horizontal manners, the ability to detect fraud is even further enhanced.

Accordingly, a database of historical identity records 316, as described above, becomes a powerful differentiator when it comes to fraud detection. It is only by including database 316 that the statistical analysis and evaluation of variables described above can take place. It should be clear that including more records in database 316 can increase the accuracy of fraud detection by providing more data against which to compare new applications. Thus, as mentioned, the ability to reduce the size of the data stored in database 316, e.g., via the use of adjacency matrices with sparse representation and localization can be important in preventing the data stored in database 316 from becoming too unwieldy.

It should be noted, however, that database 316 can actually comprise a plurality of databases localized on one server or distributed between a plurality of servers. Thus, the size of database 316 is potentially unlimited. Rather, it is the practical limitation of speed and efficiency that limit the usable size of database 316. These types of limits, however, vary with the implementation and the hardware and software systems available.

It should be further noted that database 316 is being used in real-time to detect fraud. As each identity related risk event is being evaluated in real-time, it is also added to database 316 in order to benefit fraud detection in subsequent events. Furthermore, in model building, database 316 is also used by capturing the historical state of the database at the point of each identity risk event. Using the entirety of database 316 in both model building and production is significant because: All of the historical risk events in database 316 are being utilized in model building; And this process simulates the production environment at each risk event, therefore making the model more accurate.

11. Integration of Transaction Based Information

As mentioned above, identity records 203 can comprise information related to transaction as well as new account applications. Accordingly, the historical identity records of database 316 can similarly include information related to transaction as well as applications; however, many embodiments are directed solely to the fraud evaluation of new account applications. As mentioned, having a historical database 316 that comprises records related to many client institutions 130 across multiple industries and segments is a powerful tool in evaluating new applications for fraud. In certain embodiments, however, transactional information can also be integrated within system 100 to augment the ability to detect fraud or to provide the ability to detect other types of fraud. Again, it is preferable if the transactional information is aggregated for a plurality of client institutions 130 across a plurality of industries and segments.

Fraudsters typically have very identifiable purchase and payment patterns. Further, they are typically defrauding several client institutions 130 simultaneously. Thus, by aggregating historical data for applications and transactions, including payment transactions, within one or more databases, these patterns can be detected using similar techniques as those described above.

For example, it has been observed that a common fraud technique is where the fraudster opens a new account, such as a credit card account, and begins charging purchases to the account on a monthly basis. The fraudster then pays the minimum amount due each month so that the credit card company does not suspect anything. Typically, the fraudster will reach the limit on the account in a short period of time, e.g., the fraudster can reach a $5,000 limit in a few months, at which point the fraudster will request that the balance be increased so that he can continue using the account. Because he has a perfect record of paying the minimum balance, the credit card company will often comply by increasing the limit, e.g., doubling the limit. The fraudster will then reach the new limit within a few months, while continuing to pay the minimum payment each month.

A fraudster may request a new limit several times. At some point, the fraudster will then write a check for the whole balance; however, the fraudster has no intention to have sufficient funds in a checking account to cover the balance. The fraudster also knows that the credit card company will typically clear the balance on the account, while they wait for the check to go through, a process that usually takes several days. During the delay, the fraudster will use up the available open-to-buy on the account which doubles the losses to the financial institution. At this point the fraudster, who was using fake information as described under the many scenarios above, simply stops making payments and effectively disappears leaving the credit card company with thousands, even tens of thousands in uncollectible charges.

Clearly, the ability to compare such patterned behavior with historical data as described above can help identify this type of activity especially when data for a plurality of client institutions 130 across a plurality of industries and segments are used in the analysis. The importance of having historical data for a plurality of client institutions is magnified, in this type of situation, because as mentioned the fraudster is typically defrauding several institutions simultaneously, and repetitively.

Conversely, conventional fraud detection techniques have a limited ability to detect such behavior until it is too late, because conventional techniques simply look for deviations in established behavior and also only look at single accounts for single client institutions. In the example above, the fraudster establishes a pattern of heavy spending and of paying the minimum monthly payment every month. The fraudster never deviates, thus conventional techniques will not detect the fraud because there is no deviation that will standout using those techniques. Further, because conventional techniques do not use information related to other client institutions, they do not see a pattern across multiple accounts or client institutions, which further limits the ability of conventional techniques to detect this type of fraud. Moreover, since conventional techniques do not employ the GTAD technology and methods described herein, they most likely would not associate accounts with accounts that use close, or similar, but different information, e.g., names, SSNs, addresses, etc., in order to make use of information associated with a plurality of records across a plurality of client institutions 130.

Accordingly, in certain embodiments, transaction based information can be integrate with application based information in order to extent the capability of the systems and methods described and/or to allow for different types of fraudulent activity to be identified with high degrees of accuracy and limited false positives.

The foregoing description, for purposes of explanation, used specific nomenclature to provide a thorough understanding of the systems and methods described herein. However, it will be apparent that the specific details are not required in order to practice the invention. In other instances, well-known circuits and devices are shown in block diagram form in order to avoid unnecessary distraction from the underlying systems and methods being taught. Thus, the foregoing descriptions of specific embodiments are presented for purposes of illustration and description. They are not intended to be exhaustive or to limit the systems and methods described herein to the precise forms disclosed, obviously many modifications and variations are possible in view of the above teachings. The embodiments were chosen and described in order to best explain the principles of the disclosed and their practical applications, to thereby enable others to best utilize the systems and methods disclosed as well as various embodiments with various modifications as are suited to the particular use contemplated. It is intended that the following Claims and their equivalents define the scope of the invention.

What is claimed is:

1. A method for identifying a fraudulent account application, comprising: receiving, at an identity records interface, a new account application comprising a plurality of identity-related fields; linking, at a fraud detection processor, the identity-related fields associated with the new account application with identity-related fields associated with a plurality of historical account applications stored in a database, the links forming a graphical pattern; and performing statistical analysis of the graphical pattern to determine a likelihood that the new account application is fraudulent, wherein the statistical analysis comprises analyzing the graphical pattern to determine whether the graphical pattern is anomalous when considered in relation to a normal graphical pattern.

2. The method of claim 1, further comprising determining a fraud score based on the statistical analysis.

3. The method of claim 1, wherein the identity-related fields associated with the new account application and the plurality of historical account applications include a social security number.

4. The method of claim 1, wherein the identity-related fields associated with the new account application and the plurality of historical account applications include a name.

5. The method of claim 1, wherein the identity-related fields associated with the new account application and the plurality of historical account applications include an address.

6. The method of claim 1, wherein the identity-related fields associated with the new account application and the plurality of historical account applications include a telephone number.

7. The method of claim 1, wherein the statistical analysis comprises analyzing the graphical pattern to determine whether the graphical pattern is consistent with a fraudulent graphical pattern.

8. The method of claim 1, further comprising determining whether information contained in the identity-related fields associated with the new account application are valid.

9. A method for identifying a fraudulent account application, comprising: receiving, at an identity records interface, a new account application comprising a plurality of identity-related fields; linking, at a fraud detection processor, the identity-related fields associated with the new account application with identity-related fields associated with a plurality of historical account applications stored in a database, the links forming a graphical pattern; performing statistical analysis of the graphical pattern; and applying a plurality of anomaly rules to the graphical pattern, wherein one of the plurality of anomaly rules is derived by analyzing graphical patterns associated with a plurality of non-fraudulent historical identity records.

10. The method of claim 9, further comprising determining a fraud score based on the plurality of anomaly rules.

11. The method of claim 9, wherein a statistical model comprises a neighborhood of links between identity-related fields within the historical account applications.

12. A method for identifying a fraudulent account application, comprising: receiving, at an identity records interface, a new account application comprising a plurality of identity-related fields; linking, at a fraud detection processor, the identity-related fields associated with the new account application with identity-related fields associated with a plurality of historical account applications stored in a database, the links forming a graphical pattern; performing statistical analysis of the graphical pattern; and applying a plurality of anomaly rules to the graphical pattern, wherein one of the plurality of anomaly rules is derived from statistical analysis of fraud cases.

13. The method of claim 12, wherein the plurality of anomaly rules comprise rules related to multiple names under a single social security number.

14. The method of claim 12, wherein one of the plurality of anomaly rules comprises rules related to multiple names under a single address or home residence.

15. In a system comprising a database of historical account applications, a method for detecting a fraudulent account application, the method comprising: analyzing the historical account applications stored in a database to identify a normal pattern of identity-related information and links; developing a statistical model of the identified normal pattern; receiving, at an identity records interface, a new account application comprising a plurality of identity-related fields; linking, at a fraud detection processor, the identity-related fields associated with the new account application with identity-related fields associated with the historical account applications stored in the database, the links forming a graphical pattern; performing statistical analysis of the graphical pattern based on the developed statistical model of a normal pattern; and applying a plurality of anomaly rules to the graphical pattern.

16. The method of claim 15, further comprising determining a fraud score based on the plurality of anomaly rules.

17. The method of claim 15, wherein the statistical model comprises a neighborhood of links between identity-related fields within the historical account applications, and wherein the method further comprises detecting deviations from the normal identity patterns established in the statistical model.

18. The method of claim 15, wherein one of the plurality of anomaly rules is derived by statistically analyzing graphical patterns associated with a plurality of non-fraudulent historical identity records.

19. The method of claim 15, wherein one of the plurality of anomaly rules is derived from statistical analysis of fraud cases.

20. The method of claim 15, wherein the plurality of anomaly rules comprise rules related to multiple names under a single social security number.

21. The method of claim 15, wherein one of the plurality of anomaly rules comprises rules related to multiple names under a single address or home residence.

22. The method of claim 15, wherein developing the statistical model comprises using case studies of historical account applications.

23. The method of claim 15, wherein developing the statistical model comprises statistically analyzing a plurality of historical account applications.

24. A fraud detection system, comprising:
  a database configured to store a plurality of historical account applications, each of the plurality of historical account applications comprising a plurality of identity-related fields;
  an identity records interface configured to receive a new account application comprising a plurality of identity-related fields; and
  a fraud detection processor interfaced with the database and the new identity records interface, the fraud detection processor configured to:
    link the identity-related fields associated with the new account application with identity-related fields associated with a plurality of historical account applications, the links forming a graphical pattern;
    perform statistical analysis of the graphical pattern; and
    apply a plurality of anomaly rules to the graphical pattern.

25. The fraud detection system of claim 24, wherein the fraud detection processor is further configured to determine a fraud score based on the plurality of anomaly rules.

26. The fraud detection system of claim 24, wherein the statistical model comprises a neighborhood of links between identity-related fields within the historical account applications, and wherein the fraud detection processor is further configured to detect deviations from the normal identity patterns established in the statistical model.

27. The fraud detection system of claim 24, wherein one of the plurality of anomaly rules is derived by statistically analyzing graphical patterns associated with a plurality of non-fraudulent historical identity records.

28. The fraud detection system of claim 24, wherein one of the plurality of anomaly rules is derived from statistical analysis of fraud cases.

29. The fraud detection system of claim 24, wherein the plurality of anomaly rules comprise rules related to multiple names under a single social security number.

30. The fraud detection system of claim 24, wherein one of the plurality of anomaly rules comprises rules related to multiple names under a single address or home residence.

31. A fraud detection system, comprising:
  a database configured to store a plurality of historical account applications, each of the plurality of historical account applications comprising a plurality of identity-related fields;
  an identity records interface configured to receive a new account application comprising a plurality of identity-related fields; and
  a fraud detection processor interfaced with the database and the new identity records interface, the fraud detection processor configured to:
    analyze the historical account applications to identify a normal pattern of identity-related information and links;
    develop a statistical model of the identified normal pattern;
    link the identity-related fields associated with the new account application with identity-related fields associated with the historical account applications, the links forming a graphical pattern;
    perform statistical analysis of the graphical pattern based on the developed statistical model of a normal pattern; and
    apply a plurality of anomaly rules to the graphical pattern.

32. The fraud detection system of claim 31, wherein the fraud processor is further configured to determine a fraud score based on the plurality of anomaly rules.

33. The fraud detection system of claim 31, wherein the statistical model comprises a neighborhood of historical links between identity-related fields within the historical account applications, and wherein the fraud detection processor is further configured to detect deviations from the normal identity patterns established in the statistical model.

34. The fraud detection system of claim 31, wherein one of the plurality of anomaly rules is derived by statistically analyzing graphical patterns associated with a plurality of non-fraudulent historical identity records.

35. The fraud detection system of claim 31, wherein one of the plurality of anomaly rules is derived from statistical analysis of fraud cases.

36. The fraud detection system of claim 31, wherein the plurality of anomaly rules comprise rules related to multiple names under a single social security number.

37. The fraud detection system of claim 31, wherein one of the plurality of anomaly rules comprises rules related to multiple names under a single address or home residence.

38. The fraud detection system of claim 31, wherein developing the statistical model comprises using case studies of historical account applications.

39. The fraud detection system of claim 31, wherein developing the statistical model comprises statistically analyzing a plurality of historical account applications.

* * * * *

UNITED STATES PATENT AND TRADEMARK OFFICE
CERTIFICATE OF CORRECTION

PATENT NO. : 7,562,814 B1  Page 1 of 1
APPLICATION NO. : 11/026556
DATED : July 21, 2009
INVENTOR(S) : Xuhui Shao et al.

It is certified that error appears in the above-identified patent and that said Letters Patent is hereby corrected as shown below:

On the title page, insert item [75]:

--Stephen Coggeshall, Los Alamos, NM (US)--

On the title page, insert item [63]:

Under "Related U.S. Application Data":

--Continuation-in-part application of application No. 10/841,946, filed on May 7, 2004, pending, which claims priority to Provisional application No. 60/469,865, filed May 12, 2003.--

Signed and Sealed this

Tenth Day of August, 2010

David J. Kappos
*Director of the United States Patent and Trademark Office*